US011854083B1

(12) United States Patent
Guzman et al.

(10) Patent No.: US 11,854,083 B1
(45) Date of Patent: *Dec. 26, 2023

(54) METHODS AND SYSTEMS TO QUANTIFY AND INDEX LIQUIDITY RISK IN FINANCIAL MARKETS AND RISK MANAGEMENT CONTRACTS THEREON

(71) Applicant: Economic Alchemy Inc., New York, NY (US)

(72) Inventors: Giselle Claudette Guzman, New York, NY (US); Lawrence Klein, Gladwyne, PA (US)

(73) Assignee: Economic Alchemy Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,395

(22) Filed: Oct. 7, 2022

Related U.S. Application Data

(63) Continuation of application No. 16/910,028, filed on Jun. 23, 2020, now Pat. No. 11,551,305, which is a
(Continued)

(51) Int. Cl.
*G06Q 40/06* (2012.01)
(52) U.S. Cl.
CPC ................... *G06Q 40/06* (2013.01)
(58) Field of Classification Search
CPC .................................................. G06Q 40/06
See application file for complete search history.

(56) References Cited

U.S. PATENT DOCUMENTS

| 5,521,814 A | 5/1996 | Teran et al. |
| 5,701,400 A | 12/1997 | Amado |

(Continued)

FOREIGN PATENT DOCUMENTS

| EP | 2182481 A1 | 5/2010 |
| KR | 20060123116 A | 12/2006 |

(Continued)

OTHER PUBLICATIONS

Muranaga, J., & Ohsawa, M. (1997). Measurement of liquidity risk in the context of market risk calculation. a BIS volume entitled The Measurement of Aggregate Market Risk. (https://citeseerx.ist.psu.edu/viewdoc/download?doi=10.1.1.452.4012&rep=rep1&type=pdf) (Year: 1997).*

(Continued)

*Primary Examiner* — Asha Puttaiah
(74) *Attorney, Agent, or Firm* — SAGE PATENT GROUP

(57) ABSTRACT

Systems and methods for creating indicators to quantify and index financial market liquidity risk that is marked wide among a broad set of securities or asset classes or portfolio specific relative to an individual investor's portfolio holdings. A liquidity risk index can be created as a counterpart to any well-known market index, such as the Dow Jones Industrial Average® or the S&P 500® index. The present disclosure relates to risk management in financial markets and in particular to systems and methods for quantifying and indexing liquidity risk such that these indices can serve as underlying assets for futures, options, or other financial instruments that investors would use to hedge against the liquidity risk.

23 Claims, 3 Drawing Sheets

Related U.S. Application Data continuation of application No. 13/677,277, filed on Nov. 14, 2012, now abandoned.

(60) Provisional application No. 61/629,227, filed on Nov. 14, 2011.

(56) References Cited

U.S. PATENT DOCUMENTS

| | | |
|---|---|---|
| 5,727,161 A | 3/1998 | Purcell, Jr. |
| 5,812,988 A | 9/1998 | Sandretto |
| 5,852,811 A | 12/1998 | Atkins |
| 5,875,437 A | 2/1999 | Atkins |
| 5,930,762 A | 7/1999 | Masch |
| 5,946,667 A | 8/1999 | Tull, Jr. et al. |
| 5,987,435 A | 11/1999 | Weiss et al. |
| 6,018,722 A | 1/2000 | Ray et al. |
| 6,038,540 A | 3/2000 | Krist et al. |
| 6,092,056 A | 7/2000 | Tull, Jr. et al. |
| 6,125,355 A | 9/2000 | Bekaert et al. |
| 6,341,271 B1 | 1/2002 | Salvo et al. |
| 6,366,870 B2 | 4/2002 | Jarman et al. |
| 6,513,020 B1 | 1/2003 | Weiss et al. |
| 6,658,467 B1 | 12/2003 | Rice et al. |
| 6,792,399 B1 | 9/2004 | Phillips et al. |
| 6,876,992 B1 | 4/2005 | Sullivan |
| 7,062,447 B1 | 6/2006 | Valentine et al. |
| 7,072,863 B1 | 7/2006 | Phillips et al. |
| 7,175,072 B2 | 2/2007 | Krishnan et al. |
| 7,191,150 B1 | 3/2007 | Shao et al. |
| 7,415,432 B1 | 8/2008 | Gianakouros et al. |
| 7,464,006 B1 | 12/2008 | Huang |
| 7,474,985 B1 | 1/2009 | Pugh et al. |
| 7,480,659 B2 | 1/2009 | Chmura et al. |
| 7,546,265 B1 | 6/2009 | Donner |
| 7,599,872 B2 | 10/2009 | Dundas et al. |
| 7,664,693 B1 | 2/2010 | von Groll et al. |
| 7,676,375 B1 | 3/2010 | Neifeld et al. |
| 7,707,091 B1 | 4/2010 | Kauffman et al. |
| 7,730,019 B1 | 6/2010 | Graham |
| 7,769,657 B2 | 8/2010 | Chacko et al. |
| 7,958,204 B1 | 6/2011 | Phillips et al. |
| 8,108,290 B2 | 1/2012 | Speth et al. |
| 8,156,035 B2 | 4/2012 | Ferguson et al. |
| 8,190,458 B2 | 5/2012 | Back et al. |
| 8,200,477 B2 | 6/2012 | Yi et al. |
| 8,229,866 B2 | 7/2012 | Alaniz |
| 8,234,201 B1 | 7/2012 | Canabarro |
| 8,250,009 B1 | 8/2012 | Breckenridge et al. |
| 8,275,637 B1 | 9/2012 | Glacy, Jr. et al. |
| 8,335,735 B1 | 12/2012 | Chafkin et al. |
| 8,346,647 B1 | 1/2013 | Phelps et al. |
| 8,364,518 B1 | 1/2013 | Blake et al. |
| 8,407,118 B1 | 3/2013 | Zazelenchuk et al. |
| 8,433,640 B2 | 4/2013 | Rooney |
| 8,452,677 B1 | 5/2013 | de la Houssaye et al. |
| 8,515,851 B2 | 8/2013 | Cardoza et al. |
| 8,533,082 B1 | 9/2013 | Sudjianto et al. |
| 8,533,089 B1 * | 9/2013 | Renshaw ............... G06Q 40/06 705/36 R |
| 8,566,067 B2 | 10/2013 | Johnson et al. |
| 8,606,681 B2 | 12/2013 | O'Rourke |
| 8,798,399 B2 | 8/2014 | Huang et al. |
| 9,508,082 B1 | 11/2016 | Mannix et al. |
| 9,547,477 B2 | 1/2017 | Mun |
| 10,038,703 B2 | 7/2018 | Liu et al. |
| 10,296,857 B2 | 5/2019 | Martin et al. |
| 10,430,848 B2 | 10/2019 | Cotton et al. |
| 10,838,965 B1 | 11/2020 | Todd et al. |
| 2002/0023045 A1 | 2/2002 | Feilbogen et al. |
| 2002/0151992 A1 | 10/2002 | Hoffberg et al. |
| 2003/0018548 A1 | 1/2003 | Cattaneo et al. |
| 2003/0035468 A1 | 2/2003 | Corbaton et al. |
| 2003/0046212 A1 | 3/2003 | Hunter et al. |
| 2003/0074244 A1 | 4/2003 | Braxton |
| 2003/0093347 A1 | 5/2003 | Gray |
| 2003/0105703 A1 | 6/2003 | Palsky et al. |
| 2003/0130975 A1 | 7/2003 | Muller |
| 2003/0149586 A1 | 8/2003 | Chen et al. |
| 2003/0225719 A1 | 12/2003 | Juang et al. |
| 2004/0015376 A1 | 1/2004 | Zhu et al. |
| 2004/0024606 A1 | 2/2004 | Chukwu |
| 2004/0030624 A1 | 2/2004 | Nishimaki |
| 2004/0073506 A1 | 4/2004 | Tull, Jr. et al. |
| 2004/0172352 A1 | 9/2004 | Deretz |
| 2004/0181422 A1 | 9/2004 | Brand |
| 2004/0186803 A1 | 9/2004 | Weber et al. |
| 2004/0193524 A1 * | 9/2004 | Almeida ............... G06Q 40/06 705/36 R |
| 2004/0202914 A1 | 10/2004 | Sridhar et al. |
| 2004/0204775 A1 | 10/2004 | Keyes et al. |
| 2004/0267684 A1 | 12/2004 | Erdem et al. |
| 2005/0016947 A1 | 1/2005 | Fatke et al. |
| 2005/0021517 A1 | 1/2005 | Marchisio |
| 2005/0071300 A1 | 3/2005 | Bartlett et al. |
| 2005/0080704 A1 | 4/2005 | Erlach et al. |
| 2005/0096893 A1 | 5/2005 | Feraille et al. |
| 2005/0102175 A1 | 5/2005 | Dudat et al. |
| 2005/0119922 A1 | 6/2005 | Eder |
| 2005/0228591 A1 | 10/2005 | Hur et al. |
| 2005/0240465 A1 | 10/2005 | Kiran et al. |
| 2005/0262002 A1 | 11/2005 | Manning et al. |
| 2005/0273319 A1 | 12/2005 | Dittmar et al. |
| 2005/0273376 A1 | 12/2005 | Ouimet et al. |
| 2005/0273377 A1 | 12/2005 | Ouimet et al. |
| 2006/0004653 A1 | 1/2006 | Strongin, II |
| 2006/0085455 A1 | 4/2006 | Chmura et al. |
| 2006/0190303 A1 | 8/2006 | Yourist et al. |
| 2006/0248096 A1 | 11/2006 | Adam |
| 2006/0262865 A1 | 11/2006 | Moran |
| 2006/0282380 A1 | 12/2006 | Birney et al. |
| 2007/0086513 A1 | 4/2007 | Fernandez-Corbaton et al. |
| 2007/0129838 A1 | 6/2007 | Bendix |
| 2007/0130060 A1 | 6/2007 | Ariarajah et al. |
| 2007/0208599 A1 | 9/2007 | Cornford |
| 2007/0239571 A1 | 10/2007 | Michaletz |
| 2007/0244785 A1 | 10/2007 | Williams |
| 2007/0282758 A1 | 12/2007 | Vischer et al. |
| 2007/0288336 A1 * | 12/2007 | Malaviya ............... G06Q 40/00 705/35 |
| 2008/0052097 A1 | 2/2008 | Bouzas et al. |
| 2008/0071588 A1 | 3/2008 | Eder |
| 2008/0120250 A1 | 5/2008 | Hiatt, Jr. |
| 2008/0222052 A1 | 9/2008 | Choueifaty |
| 2008/0270314 A1 | 10/2008 | Birney et al. |
| 2008/0281581 A1 | 11/2008 | Henshaw et al. |
| 2008/0288596 A1 | 11/2008 | Smith et al. |
| 2008/0319712 A1 | 12/2008 | Claps |
| 2008/0319829 A1 | 12/2008 | Hunt et al. |
| 2008/0319923 A1 | 12/2008 | Casey et al. |
| 2009/0018891 A1 | 1/2009 | Eder |
| 2009/0018996 A1 | 1/2009 | Hunt et al. |
| 2009/0043637 A1 | 2/2009 | Eder |
| 2009/0043713 A1 | 2/2009 | Weber et al. |
| 2009/0076987 A1 | 3/2009 | Chmura et al. |
| 2009/0097772 A1 | 4/2009 | Zhao et al. |
| 2009/0119200 A1 | 5/2009 | Riviere |
| 2009/0132347 A1 | 5/2009 | Anderson et al. |
| 2009/0172821 A1 | 7/2009 | Daira et al. |
| 2009/0177589 A1 | 7/2009 | Edgar et al. |
| 2009/0204446 A1 | 8/2009 | Simon et al. |
| 2009/0217302 A1 | 8/2009 | Grechanik et al. |
| 2009/0238426 A1 | 9/2009 | Fear et al. |
| 2009/0254389 A1 | 10/2009 | Teal et al. |
| 2009/0254395 A1 | 10/2009 | Lynn et al. |
| 2009/0254971 A1 | 10/2009 | Herz et al. |
| 2009/0265281 A1 | 10/2009 | Cohen et al. |
| 2009/0281964 A1 | 11/2009 | Broms et al. |
| 2009/0292662 A1 | 11/2009 | Ueno et al. |
| 2009/0307057 A1 | 12/2009 | Azout et al. |
| 2009/0319436 A1 | 12/2009 | Andra et al. |
| 2010/0036529 A1 | 2/2010 | Landells et al. |
| 2010/0042553 A1 | 2/2010 | Van Erlach |
| 2010/0070485 A1 | 3/2010 | Parsons et al. |

(56) References Cited

U.S. PATENT DOCUMENTS

| | | |
|---|---|---|
| 2010/0076785 A1 | 3/2010 | Mehta et al. |
| 2010/0076904 A1 | 3/2010 | Ghosh et al. |
| 2010/0076966 A1 | 3/2010 | Strutton et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0125532 A1 | 5/2010 | Cohen et al. |
| 2010/0145773 A1 | 6/2010 | Desai et al. |
| 2010/0179921 A1 | 7/2010 | Scheinerman |
| 2010/0179930 A1 | 7/2010 | Teller et al. |
| 2010/0185716 A1 | 7/2010 | Nakamura et al. |
| 2010/0204967 A1 | 8/2010 | Mun |
| 2010/0205117 A1 | 8/2010 | Van Erlach et al. |
| 2010/0205124 A1 | 8/2010 | Ben-Hur et al. |
| 2010/0205131 A1 | 8/2010 | Kumar et al. |
| 2010/0228685 A1 | 9/2010 | Barsade et al. |
| 2010/0262597 A1 | 10/2010 | Han |
| 2010/0305913 A1 | 12/2010 | Johnson et al. |
| 2010/0312724 A1 | 12/2010 | Pinckney et al. |
| 2011/0040635 A1 | 2/2011 | Simmons et al. |
| 2011/0060572 A1 | 3/2011 | Brown et al. |
| 2011/0071857 A1 | 3/2011 | Malov et al. |
| 2011/0071885 A1 | 3/2011 | Ayres de Castro et al. |
| 2011/0106578 A1 | 5/2011 | Cerminaro |
| 2011/0106589 A1 | 5/2011 | Blomberg et al. |
| 2011/0112995 A1 | 5/2011 | Chang et al. |
| 2011/0125623 A1 | 5/2011 | DeLillio |
| 2011/0137825 A1 | 6/2011 | Weber et al. |
| 2011/0145126 A1* | 6/2011 | Rooney .................. G06Q 40/04 705/37 |
| 2011/0153412 A1 | 6/2011 | Novikov et al. |
| 2011/0153451 A1 | 6/2011 | Bitz et al. |
| 2011/0191372 A1 | 8/2011 | Kaushansky et al. |
| 2011/0202475 A1 | 8/2011 | Choueifaty |
| 2011/0246155 A1 | 10/2011 | Fitch et al. |
| 2011/0246179 A1 | 10/2011 | O'Neil |
| 2011/0251974 A1 | 10/2011 | Woodard et al. |
| 2011/0282943 A1 | 11/2011 | Anderson et al. |
| 2011/0302106 A1 | 12/2011 | Nosegbe |
| 2012/0019307 A1 | 1/2012 | Ludwig |
| 2012/0023040 A1 | 1/2012 | Benoit et al. |
| 2012/0030082 A1 | 2/2012 | Voltz et al. |
| 2012/0036085 A1 | 2/2012 | Srivastava et al. |
| 2012/0041880 A1 | 2/2012 | Shai |
| 2012/0041937 A1 | 2/2012 | Dhillon et al. |
| 2012/0046938 A1 | 2/2012 | Godbole et al. |
| 2012/0047219 A1 | 2/2012 | Feng et al. |
| 2012/0066024 A1 | 3/2012 | Strongin, II |
| 2012/0069131 A1 | 3/2012 | Abelow |
| 2012/0095802 A1 | 4/2012 | Wilberding et al. |
| 2012/0101805 A1 | 4/2012 | Barbosa et al. |
| 2012/0101808 A1 | 4/2012 | Duong-Van |
| 2012/0116941 A1 | 5/2012 | Pazner |
| 2012/0143683 A1 | 6/2012 | Hertz et al. |
| 2012/0143738 A1 | 6/2012 | McConnel |
| 2012/0143739 A1 | 6/2012 | Lopez de Prado et al. |
| 2012/0143740 A1 | 6/2012 | Lopez de Prado et al. |
| 2012/0143741 A1 | 6/2012 | Lopez de Prado et al. |
| 2012/0158613 A1 | 6/2012 | Bollen et al. |
| 2012/0166330 A1 | 6/2012 | Kemp, II et al. |
| 2012/0173302 A1 | 7/2012 | Dooley et al. |
| 2012/0179692 A1 | 7/2012 | Hsiao et al. |
| 2012/0185544 A1 | 7/2012 | Chang et al. |
| 2012/0191730 A1 | 7/2012 | Parikh et al. |
| 2012/0203684 A1 | 8/2012 | Gilbert et al. |
| 2012/0215717 A1 | 8/2012 | Arnott et al. |
| 2012/0226645 A1 | 9/2012 | O'Rourke |
| 2012/0246048 A1 | 9/2012 | Cohen et al. |
| 2012/0316904 A1 | 12/2012 | Eder |
| 2012/0323674 A1 | 12/2012 | Simmons et al. |
| 2012/0330810 A1 | 12/2012 | Dadkar |
| 2013/0041841 A1 | 2/2013 | Lyons |
| 2013/0041848 A1 | 2/2013 | Stubbs et al. |
| 2013/0060603 A1 | 3/2013 | Wagner |
| 2013/0218736 A1 | 8/2013 | Eisen et al. |
| 2013/0297479 A1 | 11/2013 | Rooney |
| 2013/0332391 A1 | 12/2013 | Renshaw |
| 2013/0342538 A1 | 12/2013 | Kozine et al. |
| 2014/0012776 A1 | 1/2014 | Lo et al. |
| 2014/0046872 A1 | 2/2014 | Arnott et al. |
| 2014/0067279 A1 | 3/2014 | George et al. |
| 2014/0108059 A1 | 4/2014 | Ring et al. |
| 2014/0257829 A1 | 9/2014 | Schuetz et al. |
| 2014/0278472 A1 | 9/2014 | Guetz |
| 2014/0372172 A1 | 12/2014 | Frías Martínez et al. |
| 2015/0127425 A1 | 5/2015 | Greene et al. |
| 2015/0142713 A1 | 5/2015 | Gopinathan et al. |
| 2016/0140584 A1 | 5/2016 | Moghtaderi |
| 2016/0379388 A1 | 12/2016 | Rasco et al. |
| 2017/0300824 A1 | 10/2017 | Peng et al. |

FOREIGN PATENT DOCUMENTS

| | | |
|---|---|---|
| KR | 100930505 B1 | 12/2009 |
| WO | 2002099601 A2 | 12/2002 |
| WO | 2006121338 A2 | 11/2006 |
| WO | 2007106475 A2 | 9/2007 |
| WO | 2011095988 A2 | 8/2011 |
| WO | 2011119509 A1 | 9/2011 |

OTHER PUBLICATIONS https://www.markit.com/Company/Files/PressReleaseFile?CMSID=7bc848f70957 4b9a99f4c56a71548aa0, Jun. 2016, 2 pages.

Finance Magnate, "European Commission Selects Markit for its Fixed Income Solution", Jun. 15, 2016, 3 pages. (https://www.financemagnates.com/institutional-forex/technology/european-commission-selects-markit-for-its-fixed-income-solution).

https://www.blackrock.com/us/individual/literature/whitepaper/bii-introduction-to-gps.pdf, Sep. 2016, 2 pages.

BlackRock Investment Institute, "BlackRock Macro Dashboard", 2019, 6 pages. (https://www.blackrock.com/corporate/insights/blackrock-investment-institute/data-visuals/macro-dashboard).

DeepMacro, "Frequently Asked Questions", 2016, 7 pages. (https://beta.deepmacro.com/faq).

"Ice Data Services Summary: Final SEC Rules for Liquidity Risk Management Programs", Jul. 7, 2017, 2 pages. (https://www.theice.com/market-data/pricing-and-analytics/analytics/liquidity/SECLRM, 2017).

"Ice Liquidity Indicators", Dec. 21, 2016, 3 pages. (https://web.archive.org/web/20161221065616/https://www.theice.com/market-data/pricing-and-analytics/analytics/liquidity).

Hoover, Kevin D. et al., "Data-mining reconsidered: encompassing and the general-to-specific approach to specific search", Econometrics Journal (1999), vol. 2, pp. 167-191.

"Diseases Tracked by Using Google Trends", Spain, Emerging Infectious Diseases, 111.cdc.gov/eid, vol. 16, No. 1, Jan. 2010.

Angelini, Elena et al., "Estimating and forecasting the euro area monthly national accounts from a dynamic factor model"; European Central Bank, Working Paper Series, No. 953, Oct. 2008, 31 pages.

Choudhry, Moorad et al., "Measuring Bond Market Liquidity: Devising a Composite Aggregate Liquidity Score"; Applied Financial Econonmics, vol. 20, 2010; pp. 955-973.

Agrrawal, Pankaj et al., "A Multivariate Liquidity Score and Ranking Device for ETFs," 2009, Academy of Financial Services, pp. 2-18.

Medo, Matus et al.; "How to quantify the influence of correlations on investment diversification", International Review of Financial Analysis; vol. 18, Issues 1-2; Jun. 2, 2018; 14 pages.

PM Polgreen et al., "Using internet searches for influenza surveillance," Clinical Infectious Diseases, 47(2008), pp. 1443-1448.

J. Ritterman et al. "Using prediction markets and Twitter to predict a swine flu pandemic," Proceedings of the 1st International Workshop on Mining Social Media (2009).

H. Song et al., "Forecasting hotel room demand using search engine data," College of Charleston Working Paper (2009).

JH Stock et al., "Forecasting inflation," Journal of Monetary Econnomics, 44(1999), pp. 293-335.

(56) References Cited

OTHER PUBLICATIONS

JH Stock et al., "Macroeconomic forecasting using diffusion indexes," Journal of business & Economic Statistics, 20(2) 2002), pp. 147-162.
T. Suhoy, "Query indices and a 2006 downturn: Israeli data," Bank of Israel Discussion Paper (2009).
T. Suhoy, "Monthly assessments of private consumption," Bank of Israel Discussion Paper (2010).
LB Thomas, "Survey measures of expected US inflation," The Journal of Economic Perspectives 13(4) (1999), pp. 125-144.
S. Vosen et al., "Forecasting private consumption: survey-based indicators vs. Google Trends," Journal of Forecasting, 10.1002, (2011).
Klein, LR et al., "Economic Forecasting at high-frequency intervals," Journal of Forecasting, vol. 12, Issue 3-4, pp. 301-319 (Apr. 1993). http://onlinelibrary_wiley.com/doi/10.1002/for.3980120910/abstract.
Preis et al., "Complex dynamics of our economic life on different scales: insights from search engine query data," Phil. Wrans. R. Soc_A.2010 368, pp. 5707-5719.
Harding, "Google to map inflation using web data," Financial Times, Oct. 11, 2010.
Vlastakis et al., "Information Demand and Stock Market Volatility," Athena University, May 2010.
Zhi Da et al., "In Search of Attention," SSRN 1364209, Jun. 4, 2009, 45 pages.
Finance Team, "Google Domestic Trends," download date Jul. 17, 2015.
Sharad Goel, "What can search predict?" Messy Matters, Nov. 30, 2009.
Goel et al., "What can search predict?" Yahoo! Labs; Jan. 1, 1979.
Ettredge et al., "Using web-based search data to predict macroeconomic statistics," Commun, ACM, 48(11) 87(92), 2005.
Huang et al., "Constructing Consumer Sentiment Index for US Using Internet Search Patterns"; University of Alberta, Department of Economics, Working Paper No. 2009-26, Oct. 2009, 22 pages.
Shimshoni et al., "On the Predictability of Trends," Google, Israel Labs, Aug. 17, 2009.
Sornette et al., "Endogenous versus exogenous shocks in complex network: an empirical test using book sale rankings," APS preprint, Feb. 2, 2006.
Valdivia et al., "Diseases tracked by using Google Trends," Emerging Infectious Diseases, vol. 16, No. 1, Jan. 2010.
Pelat et al., "More diseases tracked by using Google Trends," Emerging Infectious Diseases, 2009, 15:1327-8.
Matheson, Troy D. (Jan. 2010). "An analysis of the informational content of New Zealand data releases: The mportance of business opinion surveys", Economic Modeling (Elsevier) 27 (1); pp. 304-314. http://www.sciencedirect.com/science/article/pii/S0264999309001679.
M. Woodford, "Interest and Prices", Princeton University Press, Princeton, 2003.
G. Guzman, "GDP Growth Signals, Investor Psychology, and Hedging Pressure: A Multivariable Approach to Forecasting Returns on the S&P500 Index", Independent Study, The Wharton School, University of Pennsylvania, 2003.
Hoffman et al., "Are Brand Attitudes Contagious? Consumer Response to Organic Search Trends", Nov. 2009.
Bardhan et al., "The Past as Prologue? Business Cycles and Forecasting since the 1960s", Fisher Center for Real Estate and Urban Economics, UC Berkeley, Mar. 19, 2010.
Radinsky et al., "Predicting the News of Tomorrow Using Patterns in Web Search Queries", Proceedings of the 2008 EEE/WIC/ACM International Conference on Web Intelligence, 2008.
Brownstein et al., "Digital Disease Detection—Harnessing the Web for Public Health Surveillance," The New England Uournal of Medicine; May 21, 2009.
Cooper et al., "Cancer Internet Search Activity on a Major Search Engine, United States 2001-2004," J Med Internal Res, 7, 2005.
Corely et al., "Monitoring Influenza Trends Through Mining Social Media," Proceedings of the 2009 International Conference on Bioinformatics and Computational Biology (BIOCOMP09), 2009.
Hulth et al., "Web Queries as a Source of Syndromic Surveillance," Department of Epidemiology, Swedish Institute of Infectious Disease Control, PLoS ONE, 5, 2009.
Wilson et al., "Early Detection of Disease Outbreaks Using the Internet," CMAJ, Mar. 12, 2009.
Clements et al., "Report of a Scoping Study of Forecasting in the National Accounts at the Office for National Statistics," Statistics Commission, Mar. 5, 2003.
Guzman, Giselle, "Internet Search Behavior as an Economic Forecasting Tool: The Case of Inflation Expectations," Nov. 29, 2011.
Tanaka-Yamawaki, Mieko, "Cross Correlation of Intra-Day Stock Prices in Comparison to Random Matrix Theory", Intelligent Information Management, (May 2011 ), pp. 65-70.
Pan, Feng et al., "A New Hybrid Model for Time-series Prediction," 2009 8th IEEE International Conference on Cognitive Informatics, Hong Kong China, pp. 281-286.
Moghtaderi et al., "Trend filtering via empirical mode decompositions," Computational Statistics & Data Analysis 58 (2013): 114-126, (Year: 2013), 13 pages.
Cristelli et al., "The heterogeneous dynamics of economic complexity," PLoS One. Feb. 11, 2015;10(2):e0117174. doi: 10.1371/journal.pone.0117174, PMID: 2567131, (Year: 2015), 15 pages.
Muranga et al., "Measurement of liquidity risk in the context of market risk calculation," a BIS volume entitled The Measurement of Aggregate Risk (1997), https://citeseerx.ist/psu/edu/viewdoc/download?doi=10.1.1.452.4012&rep=rep1&type=pdf, 1997, 22 pages.
Mouchart, Michel, et al.; "Clustered Panel Data Models: An Efficient Approach for Nowcasting from Poor Data"; Dec. 4, 2003; 30 pages.
Cors, Andreas et al.; "An Approach for Timely Estimations of the German GDP (Abstract)"; AStA Advances in Statistical Analysis, vol. 87, No. 2, 2003; 2 pages.
Baffigi, Alberto et al.; "Bridge Models to Forecast the Euro Area GDP (Abstract)"; International Journal of Foecasting, vol. 20, Issue 3, Jul.-Sep. 2004; 3 pages.
Mouchart, Michel, et al.; "Clustered Panel Data Models: An Efficient Approach for Nowcasting from Poor Data"; International Journal of Forecasting 21 (2005) 577-594; 2005; 18 pages.
Nunes, Luis C.; "Nowcasting Quarterly GDP Growth in a Monthly Coincident Indicator Model (Abstract)"; Journal of Forecasting, vol. 24, Issue 8; Dec. 20, 2005; 4 pages.
Altissimo, Filippo et al.; "New Eurocoin: Tracking Economic Growth in Real Time"; Centre for Economic Policy Reseach Discussion Paper Series, Discussion Paper No. 5633, Apr. 2006; 37 pages.
Banbura, Marta et al.; "A Look Into the Factor Model Black Box: Publication Lags and the Role of Hard and Soft Data in Forecasting GDP"; Nov. 2006; 26 pages.
Marcellino, Massimiliano et al.; "Factor-MIDAS for Now- and Forcasting with Ragged-Edge Data: A Model Comparision for German GDP"; Bank of England CCBS Research Forum, 2007; 41 pages.
Monti, Francesca; "Forecast with Judgement and Models"; National Bank of Belgium, Working Paper Research, No. 153, Dec. 2008; 44 pages.
Matheson, Troy et al.; "Nowcasting and Predicting Data Revisions in Real Time Using Qualitative Panel Survey Data"; Reserve Bank of New Zealand, DP2007/02, Jan. 2007; 25 pages.
Gelper, Sarah et al.; "The Predictive Power of the European Economic Sentiment Indicator"; Katholieke Universiteit Leuven, Department of Decision Sciences and Information Management, Jan. 22, 2007; 15 pages.
Galbraith, John W. et al.; "Electronic Transactions as High-Frequency Indicators of Economic Activity"; Bank of Canada, Working Paper 2007-58, Dec. 2007; 29 pages.
Clements, Michael P. et al.; "Macroeconomic Forecasting with Mixed-Frequency Data: Forecasting Output Growth in the United States"; Journal of Nusiness and Economic Statistics, Oct. 2008, 10 pages.

(56) References Cited

OTHER PUBLICATIONS

Darne, Olivier; "Using Business Survey in Industrial and Services Sector to Nowcast GDP Growth: The French Case"; Economic Bulletin, Jul. 2008; 10 pages.

Kholodilin, Konstantin A., et al.; "A New Business Barometer for Germany: Construction and Evaluation of the Nowcast Accuracy"; Nov. 18, 2008; 11 pages.

D'Agostino, Antonello, et al.; "Now-Casting Irish GDP"; Central Bank & Financial Servies Authroity of Ireland, Research Technical Paper, 9/RT/08, Nov. 2008; 25 pages.

Proietti, Tommaso; "Estimation fo Common Factors under Cross-Sectional and Temporal Aggregation Constraints: Nowcasting Monthly GDP and its Main Components (Abstract)"; MPRA Paper, University Library of Munich, Germany, New Economic Papers, Jan. 22, 2008; 1 page.

Aastveit, Knut Are, et al.; "Estimating the Output Gap in Real-Time: A Factor Model Approach"; Dec. 9, 2008; 40 pages.

Lee, Kevin, et al.; "Nowcasting, Business Cycle Dating and the Interpreation of the New Information when Real Time Data are Available"; The University of Melbourne, Department of Economics, Research Paper No. 1040, May 2008; 45 pages.

Kuzin, Vladimir, et al.; "Pooling Versus Model Selection for Nowcasting with Many Predictors: An Application to German GDP"; Deutsche Bundesbank Eurosystem, Discussion Paper, Series 1: Economic Studies, No. 03/2009, 2009, 55 pages.

Castle, Jennifer, et al.; "Nowcasting is Not Just Contemporaneous Forecasting"; National Institute Economic Review, 2009; 26 pages.

Schorfheide, Frank et al.; "Evaluating DSGE Model Forecasts of Comovements"; University of Pennsylvania, Oct. 17, 2010; 57 pages.

Aruoba, A. Boragan, et al.; "Real-Time Macroeconomic Monitoring: Real Activity, Inflation, and Interactions"; National Bureau of Economic Research, Working Paper 15657, Jan. 2010; 17 pages.

Kholodilin, Konstantin A., et al.; "Do Google Searches Help in Nowcasting Private Consumption? A Real-Time Evidence for the US"; ETH Zurich, Research Collection, Working Paper, Apr. 2010; 29 pages.

Gilbert, Thomas, et al.; "Why Do Certain Macroeconomic News Announcements Have a Big Impact on Asset Prices?"; Apr. 6, 2010; 38 pages.

Rossiter, James; "Nowcasting the Global Economy"; Bank of Canada Discussion Paper 2010-12, Sep. 2010; 26 pages.

Norin, Anna; "Nowcasting of the Gross Regional Product"; 50th Congress of the European Regional Science Association: Sustainable Regional Growth and Development in the Creative Knowledge Economy, Aug. 19-23, 2010, 11 pages.

Liebermann, Joelle; "Real-Time Nowcasting of GDP: Factor Model Versus Professional Forecasters"; Munich Personal RePEc Archive, Dec. 2010; 36 pages.

Faust, Jon et al.; "Credit Spreads as Predictors of Real-Time Economic Activity: A Bayesian Model-Averaging Approach"; National Bureau of Economic Research, Working Paper 16725, Jan. 2011; 41 pages.

Askitas, Nikolaos et al.; "Nowcasting Business Cycles Using Toll Data"; IZA Discussion Paper No. 5522, Feb. 2011; 19 pages.

Lahiri, Kajal et al.; "Nowcasting US GDP: The Role of ISM Business Surveys"; SUNY Department of Economics, Mar. 2011; 30 pages.

Sorensen, Jonas; "Indicator Models for Private Consumption"; Monetary Review, 1st Quarter 2011, Part 1; 13 pages.

Garratt, Anthony et al.; "Measuring Output Gap Nowcast Uncertainty"; The Australian National University, Centre for Applied Macroeconomic Analysis (CAMA), CAMA Working Paper 16/2011, Jun. 2011; 24 pages.

Banbura, Marta et al., "Nowcasting," Working Papers ECARES 2010-021, Oxford Handbook on Economic Forecasting (2010), 36 pages.

Branch, William A.; "Nowcasting and the Taylor Rule"; University of California, Irvine, Jul. 11, 2011; 32 pages.

Carnot, Vincent et al.; "Economic Forecasting and Policy"; Second Edition, Chapter 2, Jul. 26, 2011; 8 pages.

Guzman, Giselle C.; "Using Sentiment to Predict GDP Growth and Stock Returns"; Preliminary Draft, Munich Personal RePEc Archive, Jun. 29, 2008, 41 pages.

Guzman, Giselle C.; "An Inflation Expectations Horserace"; Preliminary Draft, Munich Personal RePEc Archive, Jan. 25, 2010; 44 pages.

Guzman, Giselle C.; "The Case for Higher Frequency Inflation Expectations"; Preliminary Draft, Munich Personal RePEc Archive, Jun. 29, 2011; 44 pages.

Guzman, Giselle C.; "Internet Search Behavior as an Economic Forecasting Tool: The Case of Inflation Expectations"; Preliminary Draft, Munich Personal RePEc Archive, Nov. 29, 2011; 38 pages.

Vosen, Simeon et al.; "A Monthly Consumption Indicator for Germany Based on Internet Search Query Data"; Applied Economic Letters, vol. 19, Iss. 7, 2012; 27 pages.

Wieland, Volker et al.; "Macroeconomic Model Comparisons and Forecast Competitions"; Voxeu.org, Feb. 13, 2012; 4 pages.

Matteson, David S.; "Time-Frequency Functional Models: An Approach for Identifying and Predicting Economic Recessions in Real-Time"; Cornell University, Department of Statistical Science, May 17, 2014; 42 pages.

Molodtsova, Tanya et al.; "Taylor Rule Exchange Rate Forecasting During the Financial Crisis"; National Bureau of Economic Research, Working Paper 18330, Aug. 2012; 41 pages.

Scotti, Chiara et al.; "Real-Time Aggregation of Macroeconomic Surprises: A Real Activity Surprise Index"; Federal Reserve Board, Apr. 26, 2012; 24 pages.

Campbell, Jeffrey R. et al.; "Macroeconomic Effects of Federal Reserve Forward Guidance"; Working Paper 2012-03, Federal Reserve Bank of Chicago, 2012; 61 pages.

D'Agostino, Antonello et al.; "Survey-Based Nowcasting of US Growth: A Real-Time Forecast Comparison Over More Than 40 Years"; European Central Bank, Working Paper No. 1455, 2012; 23 pages.

Kuzin, Vladimir, et al.; "Pooling Versus Model Selection for Nowcasting GDP with Many Predictors: Empirical Evidence for Six Industrialized Countries"; Deutsche Bundesbank, 2013; 65 pages.

Hendry, David et al.; "Forecasting and Nowcasting Macroeconomic Variables: A Methodological Overview"; University of Oxford, Department of Economics, Discussion Paper No. 674, Sep. 2013; 74 pages.

Koop, Gary et al.; "Macroeconomic Nowcasting Using Google Probabilities"; Aug. 2013; 31 pages.

Klein et al., "The University of Pennsylvania Model for High-Frequency Economic Forecasting," Economic & Financial Modeling, Autumn 1995.

Klein et al., "Combinations of High and Low Frequency Data in Macroeconomics Models," University of Pennsylvania, 2008.

Giannone, Domenico; Reichlin, Lucrezia; Small, David, (May 2008), "Nowcasting: The real-time informational content of macroeconomic data," Journal of Monetary Economics (Elsevier) 55(4): pp. 665-676.

Camacho, Maximo; Perez-Quiros, Gabriel (2010), "Introducing the euro-sting: Short-term indicator of Euro Area Growth," Journal of Applied Econometrics (John Wiley & sons) 25 (4): pp. 663-694.

Evans, Martin D.D. (Sep. 2005). "Where Are We Now? Real-Time Estimates of the Macroeconomy," International Journal of Central Banking 1(2).

Runstler et al., "Short-term forecasting of GDP using large datasets: a pseudo real-time forecast evaluation exercise," Journal of Forecasting (John Wiley & Sons) 28(7) C. (2009), pp. 595-611.

Giannone, Domenico et al. (Nov. 23, 2009), "Is the UK still in recession? We don't think so." Vox.

Banbura, Marta et al., "Nowcasting," Working Papers ECARES 2010-021, Oxford Handbook on Economic Forecasting (2010).

Andreou, Elena, et al., "Forecasting with Mixed-Frequency Data," Oxford Handbook of Economic Forecasting, (2010).

Andreou, Elena et al., "Regression models with Mixed Sampling Frequencies," Journal of Econometrics, (2010), pp. 256-261.

(56) References Cited

OTHER PUBLICATIONS

A. Ang et al., "Do macro variables, asset markets, or surveys forecast inflation better?" Journal of Monetary Economics, 54 (2007), pp. 1163-1212.
C. Anvik and K. Gjelstad, "Just Google It," Forecasting Norwegian unemployment: figures with web queries; Center for Research in Economics and Management CREAM Publication 11 (2010).
N. Askitas and K. Zimmerman, "Google econometrics and unemployment forecasting," Applied Economics Quarterly 65(2) (2009), pp. 107-120.
G. Calvo, "Staggered prices in a utility-maximizing framework," Journal of Monetary Economics 12 (1983), pp. 383-398.
C. Carroll, "Macroeconomic expectations of households and professional forecasters," The Quarterly Journal of Economics 118(1) (2003), pp. 269-298.
H. Choi and H. Varian, "Predicting the present with Google Trends," www.google.com/googleblogs/ .. ./googlepredictingthepresent.pdf (2009).
H. Choi and H. Varian, "Predicting initial claims for unemployment benefits," research.google.com/archive/papers/nitialclaimsUS.pdf (2009).
A. Constant and K. Zimmerman, "Face to face with the financial crisis: The U.S. Presidential election from a transnational perspective," German Institute for Economic Research Weekly Report 16/2008 (4)(2009).
F. D'Amuri, "Predicting unemployment in short samples with internet job search query data," MPRA Paper 18403 (2009).
F. D'Amuri and J. Marcucci, "Google It" Forecasting the US unemployment rate with a Google job search index, Fondazione Eni Ennco Mattei Working Papers, 421 (2010); 58 pages.
R.F. Engle and CWJ Granger, "Co-integration and error correction: Representation, estimation, and testing," Econometrica 55 (1987), pp. 251-276.
G. Eysenbach, "Infodemiology: Tracking flu-related searches on the web for syndromic suveillance," AMIA 2006, Symposium Proceedings (2006), pp. 244-248.
Pula, Gabor et al.; "Can Business Confidence Indicators Be Useful to Predict Short-Term Industrial Growth in Hungary?"; Magyar Nemzeti Bank, MNB Background Studies Mar. 2002; Sep. 2002; 38 pages.
J. Ginsberg, et al. "Detecting influenza epidemics using search engine query data," Nature 457 (19) (2009).
S. GOEL et al., "Predicting consumer behavior with web search," PNAS Early Edition (2010).
E.M. Gramlich, "Models of inflation expectations formation: A comparison of household and economist forecasts," Journal of Money, Credit, and Banking, 15(2) (1983), pp. 155-173.
CWJ Granger et al., "Forecasting Economic Time Series," Academic Press, Florida, 1977, pp. vii viii, ix, 13, 14, 25.
AP Grant et al., "Inflationary expectations and rationality revisited," Economics Letters 62 (1999), pp. 331-338.
G. Guzman, "Using sentiment surveys to predict GDP growth and stock returns," in The Making of National Forecasts LR Klein, ed., Edward Elgar Publishing Ltd., London, 2009, pp. 319-351.
D. Harvey et al., "Testing the equality of prediction mean squared errors," International Journal of Forecasting, 13 (1997), pp. 281-291.
R. Kulkarni et al., "Forecasting housing prices with Google econometrics," George Mason University School of Public Policy Research Paper 10 (2009).
M. Lanne et al., "A Naive sticky information model of households' expectations," Journal of Economic Dynamics & Control, B3 (2009), pp. 1332-1344.
G. Mankiw and R. Reis, "Sticky information versus sticky prices. A proposal to replace the New Keynesian Phillips Curve," The Quarterly Journal of Economics 117(4)(2002), pp. 1295-1328.
R. Mariano and D. Preve, "Statistical Tests for Multiple Forecast Comparison," Presentation, TW Anderson Conference, Stanford University, 2008.

YP Mehra, "Survey measures of expected inflation: Revisiting the issues of predictive content and rationality." Federal Reserve Bank of Richmond Economic Quarterly 88/3 (2002), pp. 17-35.
WA Morgan, "A test for significance of the difference between the two variances in a sample from a normal to variate populations," Biometrika 31 (1939), pp. 13-19.
Elshenawy, Lamiaa M. et al., "Efficient Recursive Principal Component Analysis Algorithms for Process Monitoring", Ind. Eng. Chem. Res. 2010, 49, pp. 252-259 (Year: 2010).
Hamid Krim et al., "Two decades of Array Signal Processing Research", IEEE Signal Processing Magazine (vol. 13, Issue: 4, Jul. 1996), pp. 67-94.
Giannone, Domenico et al.; "Nowcasting GDP and Inflation: The Real-Time Informational Content of Macroeconomic Data Releases"; Finance and Economics Discussion Series, Divisions of Research & Statistics and Monetary Affairs, Federal Reserve Board, Washington D.C.; Sep. 2005, 42 pages.
Giannone, Domenico et al.; "Monetary Policy in Real Time"; NBER Macroeconomics Annual 2004, vol. 19, Apr. 2005; 65 pages.
Giannone, Domenico et al.; "Nowcasting GDP and Inflation: The Real-Time Informational Content of Macroeconomic Data Releases"; European Central Bank (ECB); ECB Working Paper No. 633, 2006; 51 pages.
Giannone, Domenico et al.; "Incorporating Conjunctural Analysis in Structural Models"; Mar. 21, 2008; 24 pages.
Angelini, Elena et al., "Short-Term Forecasts of Euro Area GDP Growth"; European Central Bank, Working Paper Series, No. 949, Oct. 2008; 31 pages.
Giannone, Domenico et al.; "Nowcasting Euro Area Economic Activity in Real-Time: The Role of Confidence Indicators"; Centre for Studies in Economics and Finance, Working Paper No. 240; Nov. 2009; 24 pages.
Banbura, Marta et al.; "Nowcasting with Daily Data"; Oct. 21, 2011; 31 pages.
Wikipedia; "Nowcasting (Economics)"; Dec. 19, 2010; 3 pages.
Wikipedia; "Nowcasting (Economics)—Old Revisions"; Dec. 19, 2010; 13 pages.
Schreyer, Paul et al.; "Short-Term Indicators: Using Qualitative Indicators to Update Production Indices"; OECD Science, Technology and Industry Working Papers 1996/03, 1996; 23 pages.
Baffigi, Alberto et al.; "Real-Time GDP Forecasting in the Euro Area"; Banca D'Italia, Temi di discussione del Servizio Studi, No. 456, Dec. 2002; 42 pages.
Antenucci, Dolan et al.; "Ringtail: Feature Selection for Easier Nowcasting"; 16th International Workshop on the Web and Databases, Jun. 23, 2013, New York, NY; 6 pages.
Giusto, Andrea et al.; "Nowcasting U.S. Business Cycle Turning Points with Vector Quantization"; Dalhousie University, Department of Economics, Sep. 2013; 35 pages.
Herrmannova, Lenka; "Forecasting and Nowcasting Power of Confidence Indicators: Evidence for Central Europe"; Charles University in Prague, Instutute of Economic Studies, Rigorous Thesis, Sep. 9, 2013; 140 pages.
Picerno, James; "Nowcasting the Business Cycle: A Practical Guide for Spotting Business Cycle Peaks Ahead of the Crowd"; Beta Publishing, 2014; 6 pages.
O'Donoghue, Cathal et al.; "Nowcasting in Microsimulation Models: A Methodological Survey"; Journal of Artificial Societies and Social Simulation 17 (4) 12, Oct. 31, 2014, 11 pages.
Brave, Scott A. et al.; "Nowcasting Using the Chicago Fed National Activity Index"; Federal Reserve Bank of Chicago, 2014; 107 pages.
Higgins, Patrick; "GDP Now: A Model for GDP 'Nowcasting'"; Working Paper No. 2014-7, Federal Reserve Bank of Atlanta, 2014; 87 pages.
Duffy, David et al.; "Quarterly Economic Commentary"; The Economic and Social Research Institute, Oct. 8, 2014; 100 pages.
Kourentzes, Nikolaos et al.; "Increasing Knowledge Base for Nowcasting GDP by Quantifying the Sentiment About the State of Economy"; Workshop on Using Big Data for Forecasting and Statistics, Feb. 15, 2014; 16 pages.

(56) References Cited

OTHER PUBLICATIONS

Kunovac, Davor et al.; "Nowcasting GDP Using Available Monthly Indicators"; Croatian National Bank, Working Papers W-39, Oct. 2014; 28 pages.
Massachusetts Institute of Technology; "The Emerging Pitfalls of Nowcasting with Big Data"; Aug. 18, 2014; 6 pages.
United Nations; "Handbook on Economic Tendency Surveys"; Statistical Papers, Series M, No. 96; 2015; 253 pages.
Caruso, Alberto; "Nowcasting Mexican GDP"; Ecares Working Paper 2015-40; Oct. 2015; 30 pages.
Henzel, Steffen et al.; "Nowcasting Regional GDP: The Case of the Free State of Saxony"; CESifo Working Paper, No. 5336; Apr. 2015; 29 pages.
Galbraith, John W. et al.; "Nowcasting GDP with Electronic Payments Data"; European Central Bank (ECB); ECB Statistics Paper No. 10; Aug. 2015; 21 pages.
Kovacs, Kevin et al.; "Nowcasting German Turning Points Using CUSUM Analysis"; The George Washington University Center of Economic Research, Research Program on Forecasting (RPF); RPF Working Paper No. 2016-014; Dec. 20, 2016; 18 pages.
Modugno, Michele et al.; "Nowcasting Turkish GDP and News Decomposition"; Finance and Economics Discussion Series 2016-044; May 2016; 40 pages.
Abdalla, Ahmed; "The Power of Aggregate Book-to-Market Innovations: Forecasting, Nowcasting, and Dating the Real Economy"; London School of Economics; Jul. 2016; 52 pages.
Kim, Hyan Hak et al.; "Methods for Pastcasting, Nowcasting and Forecasting Using Factor-MIDAS"; Aug. 2016; 50 pages.
Diebold, Francis X.; "Forecasting in Economics, Business, Finance and Beyond"; University of Pennsylvania, Edition 2017, Aug. 1, 2017; 619 pages.
Chernis, Tony et al.; "A Dynamic Factor Model for Nowcasting Canadian GDP Growth"; Bank of Canada Working Paper No. 2017-2, Feb. 2017; 30 pages.
Marsilli, Clement; "Nowcasting US Inflation Using a Midas Augmented Phillips Curve"; Int. J. Computational Economics and Econometrics, vol. 7, Nos. 1/2, 2017; 14 pages.
Dahlhaus, Tatjana et al.; "Nowcasting BRIC+M in Real Time"; Bank of Canada Working Paper No. 2015-38, Oct. 2015; 45 pages.
Antolin-Diaz, Juan et al.; "Advances in Nowcasting Economic Activity"; XIII Annual Conference on Real-Time Data Analysis, Bank of Spain, Oct. 19, 2017; 50 pages.
Glaeser, Edward L. et al.; "Nowcasting the Local Economy: Using Yelp Data to Measure Economic Activity"; Harvard Business School, Working Paper 18-022, Oct. 2017; 56 pages.
Dartmouth College, Tuck School of Business, Elective Courses, 2020; 54 pages.
"King's College London PhD Studentships in Economic Measurement: Economic Statistics, Centre of Excellence 2017, UK"; 2017; 6 pages.
University of Kansas Economics; Student Conference Presentations 2007-2015; 7 pages.
Federal Reserve Bank of New York, Research and Statistic Group, Research Analyst Program; 2018; 12 pages.
"Advanced Workshop for Central Bankers"; Centre for International Macroeconomics, Northwestern University, Sep. 6-13, 2016; 6 pages.
MIT Center for Digital Business, 2012 Calendar of Events; 2 pages.
Columbia University, Quantitative Methods in the Social Sciences (QMSS) Courses, 2012; 7 pages.
Midwest Economics Group (MEG) Program, 26th Annual Meeting of the Midwest Economics Group, Department of conomics, University of Illinois at Urbana-Champaign, Oct. 21-22, 2016; 14 pages.
European Commission, Collaboration in Research and Methodology for Official Statistics, "Workshop on Using Big Data for Forecasting and Statistics"; Apr. 7-8, 2014; 4 pages.
Norges Bank, Central Bank of Norway, "Recent Developments in the Econometrics of Macroeconomics and Finance"; Jun. 2-4, 2010; 2 pages.
Brandeis University, Econ/Fin250a Introduction, Spring 2018; 4 pages.
Federal Reserve Bank of Atlanta; "Nowcast for Real Gross Private Domestic Investment: Fixed Investment: Business"; Mar. 1, 2018; 34 pages.
Nowcasting Scotland, "February Nowcasts!"; Feb. 6, 2018; 2 pages.
PwC Global; "Economic Integration: The Key to Unlocking ASEAN's Export Potential?"; Global Economy Watch Monthly Macroeconomic Publication, Oct. 2017; 6 pages.
Fulcrum Asset Management; "Global Surveys or Hard Data—Which are the Fake News?"; 2016; 3 pages.
American Economic Association; "JOE—Dec. 2013", 3 pages.
American Economic Association; "JOE Listings (Job Openings for Economists)"; Feb. 1, 2017-Jul. 31, 2017; 2 pages.
M. Ege Yazgan Curriculum Vitae, 2014; 1 page.
Simon Kirby Curriculum Vitae, National Institute of Economic and Social Research, 2017; 3 pages.
Jack Fosten Introduction, Google, 2017; 1 page.
Carl Bonham, UHERO Executive Director and Professor of Economics, University of Hawaii, 2018; 2 pages.
Ahmed M. Abdalla Curriculum Vitae, 2017; 4 pages.
Ozertem et al., "Recursive Generalized Eigendecomposition for Independent Component Analysis", Independent Component Analysis and Blind Signal Separation, vol. 3889, (2006), pp. 198-205.
"CBOE S&P 500 Implied Correlation Index", Chicago Board Options Exchange, Incorporated, (2009), 9 pgs.
Guzman, Giselle, "Sexonomics: Gender, Wealth, and Expectations in Financial Markets", Journal of Economic and Social Measurement, 37, (2012), pp. 1-60.
Office Action for U.S. Appl. No. 13/677,276 dated Jan. 6, 2015; 12 pgs.
U.S. Appl. No. 13/677,277, Non-Final Office Action dated Oct. 15, 2014, 6 pgs.
U.S. Appl. No. 13/677,277, Non-Final Office Action dated Mar. 24, 2014, 5 pgs.
U.S. Appl. No. 13/677,278, Final Office Action dated Oct. 9, 2014, 13 pgs.
U.S. Appl. No. 13/677,278, Restriction Requirement dated Dec. 24, 2013, 7 pgs.
U.S. Appl. No. 13/677,278, Non-Final Office Action dated May 22, 2013, 10 pgs.
U.S. Appl. No. 13/677,297, Non-Final Office Action dated Jan. 16, 2014, 8 pgs.
U.S. Appl. No. 13/677,297, Non-Final Office Action dated Oct. 23, 2014, 13 pgs.
Klein, Lawrence R, "The Making of National Economic Forecasts", Edward Elgar Publishing Limited, Northampton, MA, USA, (2009), 403 pgs.
Schmidt, Thorsten, "Correlation and Correlation Risk", University of Leipzig, Dep. of Mathematics, 2009, 4 pgs.
Driessen et al., "The Price of Correlation Risk: Evidence from Equity Options", The Journal of Finance, vol. 64, No. 3, Jun. 2009, 30 pgs.
U.S. Appl. No. 13/677,273, Notice of Allowance dated Oct. 1, 2014, 3 pgs.
U.S. Appl. No. 13/677,273, Non-Final Office Action dated Mar. 25, 2014, 14 pgs.
Amihud, Yakov; "Illiquidity and Stock Returns: Cross-Section and Time-Series Effects"; Journal of Financial Markets 5 (2002) pp. 31-56.

\* cited by examiner

Liquidity Risk Index for Dow Jones Industrial Average Over Time

Liquidity Risk Indicator
For Dow Jones Industrial Average

Daily Data, December 2001 – December 2010

METHODS AND SYSTEMS TO QUANTIFY AND INDEX LIQUIDITY RISK IN FINANCIAL MARKETS AND RISK MANAGEMENT CONTRACTS THEREON

CROSS-REFERENCE TO RELATED APPLICATIONS

This application is a continuation of U.S. patent application Ser. No. 16/910,028, filed Jun. 23, 2020, which claims the benefit of U.S. patent application Ser. No. 13/677,277, filed Nov. 14, 2012, which claims the benefit of U.S. Provisional Patent Application No. 61/629,227, filed Nov. 14, 2011, the contents of which are incorporated by reference herein in their entireties.

This application is also related to U.S. patent application Ser. No. 13/677,273, entitled "METHODS AND SYSTEMS TO CREATE SYNTHETIC VARIABLES, INDICATORS AND INDICES FROM MULTIPLE DATA AND META-DATA SOURCES AND RISK MANAGEMENT CONTRACTS THEREON," U.S. patent application Ser. No. 13/677,276, entitled "METHODS AND SYSTEMS TO EXTRACT SIGNALS FROM LARGE AND IMPERFECT DATA SETS," U.S. patent application Ser. No. 13/677,278, entitled "METHODS AND SYSTEMS TO QUANTIFY AND INDEX CORRELATION RISK IN FINANCIAL MARKETS AND RISK MANAGEMENT CONTRACTS THEREON," and U.S. patent application Ser. No. 13/677,297, entitled "METHODS AND SYSTEMS TO QUANTIFY AND INDEX SENTIMENT RISK IN FINANCIAL MARKETS AND RISK MANAGEMENT CONTRACTS THEREON," all of which were filed on Nov. 14, 2012 and are incorporated by reference herein in their entireties.

TECHNICAL FIELD

The present disclosure relates to risk management in financial markets, and in particular to systems and methods for quantifying and indexing risks such that these indices can serve as underlying assets for futures and options and other financial instruments that investors would use to hedge against the risks.

BACKGROUND

Markets are incomplete, in that, it is not possible to hedge against all potential risks. Recent financial crises have highlighted the need for more effective risk management. Portfolio managers are increasingly faced with the need to better understand and efficiently manage multiple sources of risk that can affect the value of their holdings. This can be particularly challenging for holders of multiple asset classes across multiple geographies. Some customized hedging solutions are available to professional money managers, such as, for example the use of swaps. But these over-the-counter instruments are unregulated, expensive, illiquid, and carry significant counter-party risk. The over-the-counter swaps market operates in the shadows of the financial markets, with an estimated size of $650 billion. (See, e.g., huffingtonpost.com/2012/07/08/us-derivatives-reform-rules_n_1656980.html, which is hereby incorporated by reference herein in its entirety.) Indeed, the lack of transparency in the swaps market is largely blamed in the collapse of financial firms such as Lehman Brothers and insurer American International Group during the financial crisis of 2007-2009, which led to billions of dollars in government bailouts, a burden ultimately shouldered by taxpayers.

The specter of regulation looms over the derivatives market. The 2010 Dodd Frank financial reform law is meant to increase transparency in order to mitigate systemic risk, but compliance with such regulation will be expensive, and many small traders will be likely shut out of the market. Additionally, customized and complex hedging solutions through the use of swaps and other derivatives have long been out of reach for individual investors, and costly regulation will further prohibit individual investors from being able to hedge their portfolios from serious risks that can devastate the value of their portfolios. Recent decades have brought technological advances that democratized equity trading for individual investors by making online trading accessible and affordable, but effective risk management remains out of reach.

Risk management must be simplified and democratized in order to build and preserve wealth, both for institutions as well as for individuals. Risk metrics and risk management contracts must be accessible, affordable, and transparent. Improved risk management techniques will assist in mitigating the boom-bubble-bust cycles that have roiled financial markets in recent decades.

One example of improvement in risk management techniques was the introduction of the Chicago Board Options Exchange Market Volatility Index®, also known by its ticker symbol, "VIX". The VIX is a popular measure of the implied volatility of S&P 500® index options. It is often referred to as the fear index or the fear gauge, because it represents one measure of the market's expectation of stock market volatility over the subsequent 30-day period. The concept of a volatility index, and financial instruments based on such an index, was first proposed by Menachem Brenner and Dan Galai in 1986, and was published in "New Financial Instruments for Hedging Changes in Volatility," appearing in the July/August 1989 issue of Financial Analysts Journal. (See, e.g., people.stern.nyu.edu/mbrenner/research/FAJ_articleon_Volatility_Der.pdf, which is hereby incorporated by reference herein in its entirety.)

While stock index options and futures give investors the ability to hedge against market and interest rate volatility, the VIX allows investors to hedge against the risk of changes in volatility. Changes in market volatility can be brought about by macroeconomic factors such as inflation or economic policy, or by firm-specific factors such as changes in capital structure or news about performance. The ability to hedge against changes in volatility has helped to complete the market by providing insurance against a very real and potentially devastating portfolio risk.

But markets remain significantly incomplete. Investors today are faced with a multitude of serious risks that remain uninsurable. These risks are frequently discussed by market practitioners and in the financial media, but they are discussed as broad concepts, often in nebulous terms. As of yet, there has not been a concerted effort to quantify and index many of these risks so that efficient and accessible hedging methods can be introduced.

There are three risks that are of particular and vital importance to investors participating in modern financial markets: 1) correlation risk; 2) liquidity risk; and 3) sentiment risk. We propose systems and methods to quantify and index these risks, and risk management contracts in order to insure against these risks. These indices would serve as underlying assets for futures and options and other financial instruments that investors would use to hedge against the risk of changes in correlation, liquidity, and sentiment in financial markets.

SUMMARY

Figure 1:
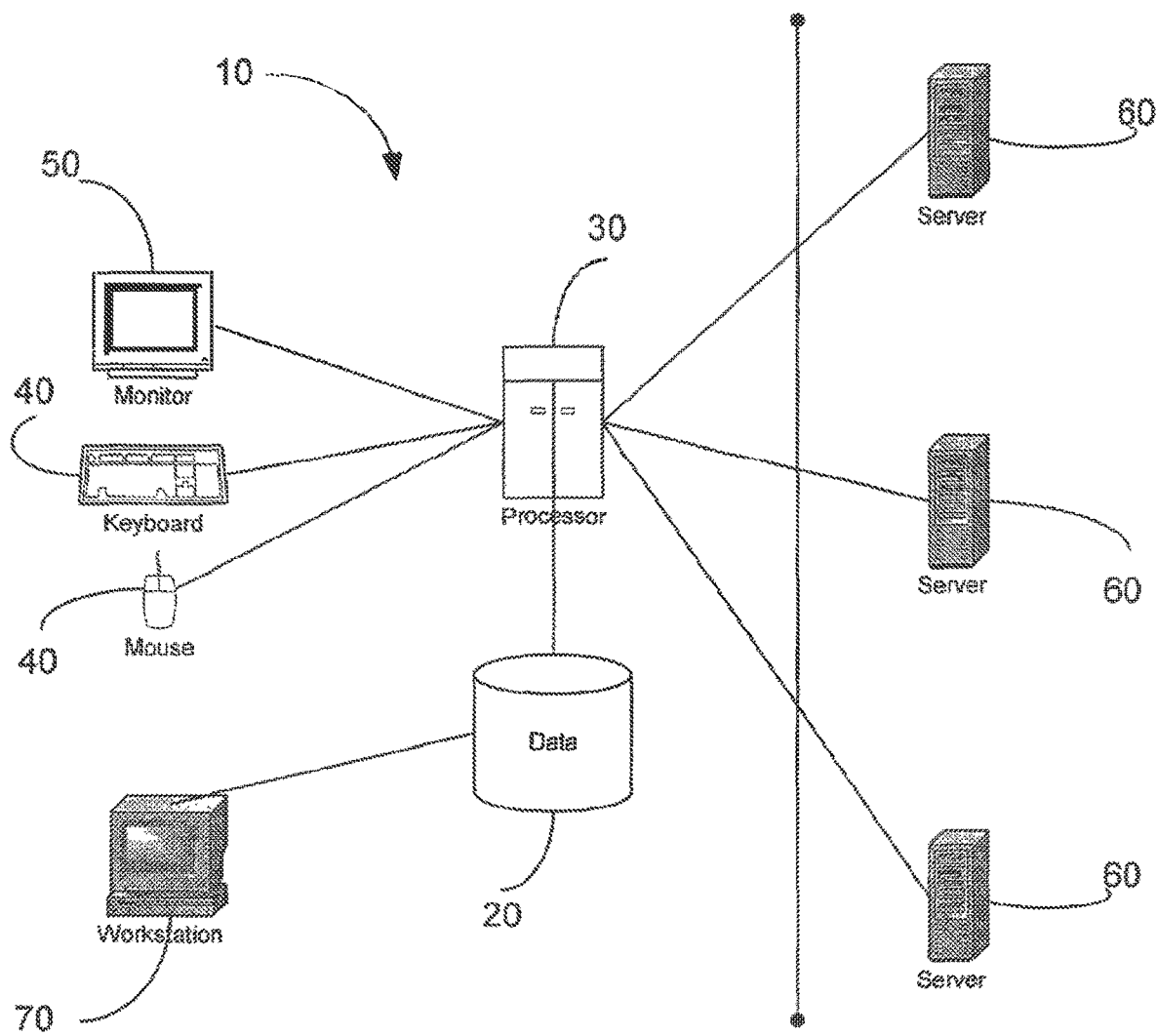
FIG. 1 illustrates an example network environment in which various exemplary embodiments of the present disclosure can operate.

Systems and methods for creating indicators to quantify and index financial market liquidity risk that is market-wide among a broad set of securities or asset classes or portfolio specific relative to an individual investor's portfolio holdings. A liquidity risk index can be created as a counterpart to any well-known market index, such as the Dow Jones Industrial Average® or the S&P 500® index. The present disclosure relates to risk management in financial markets, and in particular to systems and methods for quantifying and indexing liquidity risk such that these indices can serve as underlying assets for futures and options and other financial instruments that investors would use to hedge against the risks.

In accordance with some embodiments, a method for providing a risk index is provided, the method comprising: selecting a plurality of assets; retrieving financial data associated with each of the plurality of assets; determining a liquidity risk measurement corresponding to each of the plurality of assets based in part on the retrieved financial data; generating a plurality of composite liquidity risk measurements by applying each of a first set of weights associated with each of the plurality of assets to a corresponding liquidity risk measurement; aggregating the plurality of composite liquidity risk measurements for each of the plurality of assets to generate a liquidity risk index, wherein a second set of weights are selected from an identified index and wherein each of the second set of weights is applied to each of the plurality of composite liquidity risk measurements; and providing the liquidity risk index.

In accordance with some embodiments, a system for providing a risk index is provided, the system comprising a hardware processor that is configured to: select a plurality of assets; retrieve financial data associated with each of the plurality of assets; determine a liquidity risk measurement corresponding to each of the plurality of assets based in part on the retrieved financial data; generate a plurality of composite liquidity risk measurements by applying each of a first set of weights associated with each of the plurality of assets to a corresponding liquidity risk measurement; aggregate the plurality of composite liquidity risk measurements for each of the plurality of assets to generate a liquidity risk index, wherein a second set of weights are selected from an identified index and wherein each of the second set of weights is applied to each of the plurality of composite liquidity risk measurements; and provide the liquidity risk index.

In accordance with some embodiments, a non-transitory computer-readable medium containing computer-executable instructions that, when executed by a processor, cause the processor to perform a method for providing a risk index, is provided. The method comprising: selecting a plurality of assets; retrieving financial data associated with each of the plurality of assets; determining a liquidity risk measurement corresponding to each of the plurality of assets based in part on the retrieved financial data; generating a plurality of composite liquidity risk measurements by applying each of a first set of weights associated with each of the plurality of assets to a corresponding liquidity risk measurement; aggregating the plurality of composite liquidity risk measurements for each of the plurality of assets to generate a liquidity risk index, wherein a second set of weights are selected from an identified index and wherein each of the second set of weights is applied to each of the plurality of composite liquidity risk measurements; and providing the liquidity risk index.

In some embodiments, the method further comprises converting single or composite liquidity measures to an index.

In some embodiments, the method further comprises obtaining a composite measure by combining single measures by arbitrary weights or optimization or signal extraction method.

In some embodiments, multiple optimization or signal extraction methods are used simultaneously to choose the one that results in the lowest error or most predictive power.

In some embodiments, the method further comprises generating an alerts (e.g., text, visual, auditory, or graphical) when liquidity risk surpasses some pre-specified user-defined level or is abnormally high or low, and a scrolling ticker of values, levels, or changes (numerical or percent).

In some embodiments, the method further comprises generating analytical displays, graphs, GUIs, comparisons, trends over time, increasing, decreasing, forecasted price impact, predictive power, trade recommendations to change liquidity risk profile of a portfolio or take advantage of changing liquidity conditions in the market.

In some embodiments, the method further comprises generating a liquidity arbitrage alert for liquidity differences of securities that trade in multiple markets.

In some embodiments, the method further comprises connecting to portfolio holding data from an online brokerage account or other source to provide customized a liquidity risk measure for individual portfolio or user can input manually. In the case of a customized liquidity risk index for individual portfolio holdings, it is noted that portfolio weights must be applied, wherein the portfolio weights represent the percentage composition of a particular holding in a portfolio. Portfolio weights can be simply calculated using different approaches: the most basic type of weight is determined by dividing the dollar value of a security by the total dollar value of the portfolio. Another approach would be to divide the number of units of a given security by the total number of shares held in the portfolio.

In some embodiments, the liquidity metric can be price-based, volume-based, or time-based, or some combination of the three, whereby a composite measure is formed by assigning weights, such weights assigned arbitrarily or obtained by some optimization or signal extraction method, such as principal components analysis, whereby such signal extraction is performed in a rolling or recursive fashion in order to obtain a time series of eigenvector loadings, and further where the composite (or single) liquidity measure is then indexed and weighted to conform with some well-known index, e.g., the index weightings reflect the same weighting methodology as an index such as the S&P500®, DJIA®, etc.

In some embodiments, the method further comprises displaying the information to a user in a graphical user interface (GUI).

In some embodiments, the method further comprises generating real-time alerts regarding current or future economic or financial conditions, quantities or states, or asset prices or when the liquidity risk surpasses a defined threshold level.

In some embodiments, the defined threshold level is 5% greater than, or some other quantity.

In some embodiments, the real-time alerts are based on user-configurable conditions or parameters including one or more of: abnormally positive, abnormally negative, changes liquidity conditions above or below a pre-selected threshold, abnormally high volume, abnormally low volume, social media posts to certain websites regarding companies and their financial prospects or their stock prices or the liquidity thereof, social media posts containing certain keywords or metadata tags, and volume of Internet search queries regarding liquidity.

In some embodiments, the harvesting includes using a conversation monitoring module to collect web content to generate a real-time database of social media and web conversations related to current or future economic or financial conditions, quantities or states, or asset prices.

In some embodiments, the conversation monitoring module utilizes a web crawler.

In some embodiments, a system for analyzing social media postings on the Internet, the system comprising: a conversation monitoring module, said module having an associated web crawler, wherein, in operation, said module generates a conversation index of social media data related to liquidity conditions or current or future economic or financial conditions, quantities or states, or asset prices.

In some embodiments, the method further comprises determining how liquidity risk or financial conditions, quantities or states, or asset prices (i) trends over time, (ii) varies by source or group of sources, and/or (iii) concurrently trends over time and varies by source.

In some embodiments, the method further comprises comparing liquidity risk of a market-wide index or individual portfolio to historical returns, volume, prices, other risks such as correlation, sentiment, volatility, trends over time, visualizations, statistical analyses.

In some embodiments, the method further comprises a graphical user interface that allows a user to configure parameters, such as a wizard which prompts the user to set parameters by which the system calculates, delivers, and displays a liquidity metric for such a user-configurable measure.

In some embodiments, the method further comprises determining the moments of the liquidity metric's data series, wherein such calculations determine the statistical properties of the data, comprising one or more of the: (i) mean, (ii) median,
- (iii) mode, (iv) variance, (v) standard deviation, (vi) kurtosis, or (vii) skewness, and/or using these as elements of the metric.

In some embodiments, the method further comprises calculating the statistical relationships between data items, comprising one or more of the liquidity metrics (i) correlation, (ii) cointegration, or (iii) covariance, and using these as elements of the metric.

In some embodiments, a method of creating an indicator of liquidity risk is provided, the method comprising: selecting N assets; obtaining trade and quote data for each asset comprising of a bid price, an ask price, and transaction prices and volume; calculating a measure of liquidity risk for each asset of interest by determining the spread (ask price—bid price) and dividing the spread by the last transaction price; optionally weighting the liquidity measure by volume of shares transacted; forming a composite liquidity risk index by applying weights to the n liquidity measures to form a composite index, wherein said weights are determined either arbitrarily or by using a signal extraction algorithm and weights have value between −1 and 1, inclusive, and collectively sum to a fixed number, for example the number 1; aggregating liquidity measures across securities and applying methodology and weightings that correspond to the security's weight in an index (such as the stock's weighting in the S&P 500®).

In some embodiments, a method of hedging liquidity risk is provided, the method comprising: issuing derivatives—options, futures, or options on futures—or an Exchange Traded Fund or an Exchange Traded Note or some other financial instrument to track the value of the composite liquidity risk index; and issuing derivatives or some other financial instruments to track the value of each of the underlying liquidity measure;
  wherein as the price of each underlying derivative contract on liquidity changes, the price of the composite index changes in real time as the price of each underlying liquidity measure changes.

In some embodiments, a method of comparing liquidity risk measures and evaluating liquidity risk as predictor of future returns using statistical analyses and/or econometric models, such as OLS, MLE, GMM, and Granger Causality, for example.

DETAILED DESCRIPTION

A. Overview

In exemplary embodiments of the present disclosure, systems and methods for creating a liquidity risk index measuring market-wide liquidity of securities in a financial market or an individual portfolio of assets are presented.

The present disclosure concerns market liquidity risk, i.e., the risk that price conditions worsen when one needs to unwind a position. The term liquidity refers to different aspects of markets, such as price impact, time-to-fill, and probability of fill of various orders. Generally, liquidity means an ability to quickly trade stocks or other securities without causing a significant impact on the price. Market Liquidity is low—i.e., liquidity risk is high—when it is difficult to raise money by selling an asset, that is, when the act of selling depresses the sale price. Although the term liquidity is widely used in finance literatures, its meaning is loosely defined and there is no one quantitative measure for it, and no way to hedge against it.

There are three generally accepted notions of liquidity:
1) Price-based Measures: transaction costs, typically measured by the Bid-Ask spread, measure how much it will cost a trader to sell an asset and buy it back right away. The lower the bid-ask spread, the more liquid is the security.
2) Volume-based Measures: also known as market depth, measures how many units traders can sell or buy at the current bid or ask price without impacting the price
3) Time-based Measures: also known as market resiliency, measures how long it takes for prices that have fallen to bounce back Liquidity decreases (or alternatively, liquidity risk increases) in times of turmoil. Therefore, liquidity risk is an important factor affecting portfolio returns. There is currently no way to hedge liquidity risk and insure a portfolio against losses due to adverse market liquidity conditions.

One solution to this problem is to create an index that measures and tracks liquidity for a collection of securities or assets. Such an index can be generalized to track the state of market-wide liquidity for a well-known index, such as the liquidity for the S&P500® or the Dow Jones Industrial Average® index for example. Similarly, such an index can be highly specialized and customized to track individual portfolio holdings, such as the liquidity of individual stocks, ETFs, particular issues of bonds, commodities, options with particular strike prices or expiration dates, and so on.

The indicators can be constructed using price and trade indication data on securities, from which a liquidity measure is calculated in real-time. Similarly, such an index can be constructed using other data, such as volume. An index can be constructed using either a singular liquidity measure or a composite liquidity measure applied to securities whereby the composite measure is obtained by applying arbitrary weights or obtaining the weights through optimization or signal extraction methods such as rolling or recursive Principal Components Analysis or another signal extraction method whereby the weights range in value between −1 and 1, inclusively, and collectively sum to a fixed number, and then the liquidity measures for different securities are aggregated and converted to an index using (i) a simple method, such as, for example, a weighted average whereby the weights can be arbitrarily assigned, or weighted by applying a pre-defined weighting scheme which mimics index weights of a well-known index such as the market-capitalization weights that are applied to the S&P 500®, or by summing and applying a divisor such as the method used to calculate the Dow-Jones Industrial Average®, or by (ii) mathematical formulae, transformations, statistical formulae, or some algorithmic method, or (iii) customized to measure the level of liquidity risk of a particular portfolio of individual holdings of various securities wherein portfolio weights are applied, or (iv) the liquidity risk for a particular individual security.

The term "data" as used herein includes transaction data, such as price, volume, and bid and ask quotes, and also includes (i) the moments of the statistical distribution of the data, such as, for example, the mean, standard deviation, variance, standard deviation, kurtosis, and skewness; (ii) statistical measures of the data, such as the median and mode; (iii) transformations such as, for example, arithmetic or logarithmic; or (iv) properties of the data over time, such as, for example, a moving average. It is also understood that the term "data" further includes various statistical relationships amongst the various sources of data, such as, for example, correlations, cointegrations, and covariances. The term data as used herein also includes transaction data such volume, volume-weighted average price, trade indication data such as bid price, ask price, and size, market depth, and technical analysis data such as relative strength indicators (RSI), moneyflow, and other price and volume data.

In exemplary embodiments of the present disclosure, once generated as described herein, such indicators can be used to identify and quantify liquidity risk in financial markets. In this case, the indicator becomes an index, whose value is calculated and changes in real time. Thus, financial instruments—i.e., risk management contracts in the form of futures, options, and options on futures or Exchange Traded Funds (ETFs) or other financial instruments—can be introduced which track the value of such an index. This can provide financial market participants with a method of hedging liquidity risk, which is currently neither quantified nor hedgeable.

Data, such as securities prices, volume, and quotes (bid and ask prices) and other data can be obtained from stock exchanges, or any number of sources including:

IHS Global Insight®, Bloomberg®, Reuters®, Capital IQ®, CME Group COMEX®, S&P Capital IQ®, Chicago Board of Trade®, Chicago Board of Options Exchange®, TAQ® Trade and Quote Data, NYMEX®, Standard & Poors®, NYSE® Euronext, NASDAQ®, or similar sources.

In exemplary embodiments of the present disclosure, an indicator can be statistically tested in an econometric model against historical price or return data in order to make a parameter estimate of the liquidity risk factor that can then be used to generate a forecast of expected returns. In the case of stock prices, a liquidity risk indicator can be tested against aggregate or cross-sectional returns to determine if liquidity risk is a factor that is priced in the market. A similar analysis can be done for aggregate returns in the case of bonds, commodities, currencies, or any other asset class.

In exemplary embodiments of the present disclosure an exemplary indicator can be tested against historical data of outcomes by means of (i) a simple statistical analysis, such as correlation or covariance, or by (ii) an econometric model such as Ordinary Least Squares, specified by $(y=a+bx+e)$ whereby the indicator would obtain associated parameter estimates, such as Alpha (a, a constant), Beta (b, the covariance between x and y divided by the variance of x), the Error (e), sigma (the standard deviation of x) and sigma-squared (the variance of x). Other methods to estimate an econometric model can include, for example, General Method of Moments, Maximum Likelihood Estimate, etc. An indicator can be modeled either linearly or non-linearly. It is recognized that in several instances the data may be of different sampling frequencies, so that either the data must be converted to the same frequency, or a technique for modeling mixed frequency data must be employed such as, for example, a MIDAS (Mixed Data Sampling) regression. Tests of bilateral feedback can be conducted via Granger Causality tests.

In exemplary embodiments of the present disclosure, indicators can be made available on a platform which allows users to (i) specify data inputs for creating custom indicators, i.e., to construct a customized Liquidity Risk Indicator for their specific portfolio by manually inputting information about their portfolio holdings or connecting to such information provided by an online brokerage account, (ii) apply a mathematical formula, statistical method, or signal extraction algorithm to calculate the indicator from one or various liquidity measures, and then aggregating to form the liquidity risk index, (iii) test the index against actual outcomes and historical data, (iv) make forecasts of future portfolio returns, and, (v) the system can generate trade recommendations to improve the liquidity risk profile of their portfolio. The indicators can be displayed numerically, or in graphical form, and can, for example, be compared to one another, displayed in real-time or as time series historical data, and/or compared to other historical data. In exemplary embodiments of the present disclosure such indicators can be used to forecast future outcomes and predict future values of various economic or financial conditions, quantities, or states, or asset prices.

Thus, various exemplary embodiments of the present disclosure can include one or more of the following processes, systems or methods:

1) The use of securities prices, transaction data, quote and trade indication data, volume data, asset prices and other data to make indicators regarding current and/or future liquidity risks of financial markets, individual portfolios, economic or financial conditions, quantities or states, or asset prices;
2) Using one or combining several of these indicators to create a composite indicator of current and/or future liquidity risks of financial markets, individual portfolios, economic or financial conditions, quantities or states, or asset prices; in such combinations the combination weights can be determined either arbitrarily or by applying an optimization or signal extraction algorithm such as rolling or recursive Principal Components Analysis whereby such weights can range in value between −1 and 1, inclusive, and collectively sum to a fixed number. (See, e.g., Hotelling, H. (1933), "Analysis of a complex of statistical variables into principal components," Journal of Educational Psychology 24, 417-441, 498-520, which is hereby incorporated by reference herein in its entirety.)
3) Creation of liquidity risk index based on the liquidity risk measures, such index created by aggregating across securities and applying methodology and index weights to mirror a well-known financial market index, or alternatively, creating a customized liquidity risk index for an individual portfolio of various assets.
4) An analysis platform for statistical and econometric models combining liquidity risk indicators and index with other economic and financial historical and real-time data sources to generate parameter estimates and make forecasts of future liquidity risk conditions, values of portfolios of assets, correlations, economic or financial data or predict asset returns, generate trade recommendations, and a securities screening module to identify buy and sell candidate securities based on their liquidity risk profile; and
5) Creation tradable financial instruments based on the value of the liquidity risk index, such that the derivative instruments (futures, options, options on futures) or Exchange Traded Fund (ETF) or some other financial instrument provide a method of hedging the risk quantified by the indicator.

A brief review of liquidity measures and liquidity risk are presented, as well as a description of common weighting methods for financial market indices. Several types of liquidity measures have appeared in the financial literature. The most common types of measures are spread measures, which calculate the difference between quoted bid and ask prices in financial markets, volume measures, and time measures. Some variants include:

Liquidity Measures

Trading Volume Per Time Interval (See, e.g., Lee, C. M. C., Mucklow, B. & Ready, M. J. (1993), 'Spreads, depths and the impact of earnings information: An intraday analysis', The Review of Financial Studies 6(2), 345-374.; Chordia, T., Subrahmanyam, A. & Anshuman, V. R. (2001), 'Trading activity and expected stock returns', Journal of Financial Economics 59, 3-32, which are hereby incorporated by reference herein in their entireties.):

$$Q_t = \sum_{i=1}^{N_t} q_i$$

where $Q_t$ is the quantity of shares traded.

Volume Duration (See, e.g., Gourieroux, C., Jasiak, J. & Le Fol, G. (1999), 'Intra-day market activity', Journal of Financial Markets 2, 193-226, which is hereby incorporated by reference herein in its entirety):

$$DurQ_t^{Q^*} = \inf\left(DurQ : \sum_{i=1}^{N_{t+DurQ}} q_i \geq \sum_{i=1}^{N_t} q_i + Q^*\right)$$

where $DurQ_t^{Q^*}$ is the time it takes to trade a certain number of shares $Q^*$ and $N_t$ is the number of trades.

Turnover (See, e.g., Chordia, T. & Swaminathan, B. (2000), 'Trading volume and cross-autocorrelations in stock returns', The Journal of Finance 55(2), 913-935; Hasbrouck, J. & Seppi, D. J. (2001), 'Common factors in prices, order flows and liquidity', Journal of Financial Economics 59, 383-411, which are hereby incorporated by reference herein in their entireties):

$$V_t = \sum_{i=1}^{N_t} p_i q_i$$

Quantity Depth (See, e.g., Huberman, G. & Halka, D. (2001), 'Systematic liquidity', The Journal of Financial Research 24(2), 161-178, which is hereby incorporated by reference herein in its entirety):

$$D_t = q_t^A + q_t^B$$

where $q_t^A$ and $q_t^B$ refer to the best bid and the best ask volume in the order book.

Log Depth (See, e.g., Butler, A. W., Grullon, G. & Weston, J. P. (2002), Stock market liquidity and the cost of raising capital. Working Paper, which is hereby incorporated by reference herein in its entirety):

$$D \log_t = \ln(q_t^A) + \ln(q_t^B) = \ln(q_t^A * q_t^B)$$

Dollar Depth (See, e.g., Brockman, P. & Chung, D. Y. (2000), 'An empirical investigation of trading on asymmetric information and heterogeneous prior beliefs', Journal of Empirical Finance 7, 417-454, which is hereby incorporated by reference herein in its entirety):

$$D\$_t = \frac{q_t^A * p_t^A + q_t^B * p_t^B}{2}$$

Number of Trades (See, e.g., Bacidore, J. M. (1997), 'The impact of decimalization on market quality: An empirical investigation of the Toronto stock exchange', Journal of Financial Intermediation 6(2), 92-120, which is hereby incorporated by reference herein in its entirety):

$$N_t$$

Waiting Time Between Trades (See, e.g., Gourieroux, C., Jasiak, J. & Le Fol, G. (1999), 'Intra-day market activity', Journal of Financial Markets 2, 193-226., which is hereby incorporated by reference herein in its entirety):

$$WT_t = \frac{1}{N-1}\sum_{i=2}^{N} tr_i - tr_{i-1}$$

Number of Orders Per Time Unit (See, e.g., Walsh, D. M. (1998), 'Evidence of price change volatility induced by the number and proportion of orders of a given size', Australian Journal of Management 23(1), 39-55, which is hereby incorporated by reference herein in its entirety):

$$NO_t$$

Absolute spread or dollar spread (See, e.g., Chordia, T., Roll, R. & Subrahmanyam, A. (2001), 'Market liquidity and trading activity', The Journal of Finance 56(2), 501-530, which is hereby incorporated by reference herein in its entirety):

$$S\ abs_t = P_t^A - P_t^B$$

Log Absolute Spread (See, e.g., Hamao, Y. & Hasbrouck, J. (1995), 'Securities trading in the absence of dealers: Trades and quotes on the Tokyo Stock Exchange', The Review of Financial Studies 8(3), 849-878, which is hereby incorporated by reference herein in its entirety):

$$\text{Log } S\ abs_t = \ln(S\ abs_t) = \ln(p_t^A - p_t^B)$$

Relative Spread with Mid-Price (See, e.g., Levin, E. J. & Wright, R. E. (1999), 'Explaining the intra-day variation in the bid-ask spread in competitive dealership markets—A research note', Journal of Financial Markets 2, 179-191, which is hereby incorporated by reference herein in its entirety):

$$SrelM_t = \frac{p_t^A - p_t^B}{p_t^M} = \frac{2(p_t^A - p_t^B)}{p_t^A + p_t^B}$$

$$\text{where } p_t^M = \frac{p_t^A + p_t^B}{2}$$

Relative Spread with Last Trade (See, e.g., Fleming, M. J. & Remolona, E. M. (1999), 'Price formation and liquidity in the U.S. Treasury market: The response to public information', The Journal of Finance 54(5), 1901-1915, which is hereby incorporated by reference herein in its entirety):

$$Srelp_t = \frac{p_t^A - p_t^B}{p_t}$$

Relative Spread of Log Prices (See, e.g., Hasbrouck, J. & Seppi, D. J. (2001), 'Common factors in prices, order flows and liquidity', Journal of Financial Economics 59, 383-411, which is hereby incorporated by reference herein in its entirety):

$$Srel\ \log_t = \ln(p_t^A) - \ln(p_t^B) = \ln\left(\frac{p_t^A}{p_t^B}\right)$$

Log Relative Spread of Log Prices (See, e.g., Dacorogna, M. M., Gençay, R., Muller, U., Olsen, R. B. & Pictet, O. V. (2001), An Introduction to High-Frequency Finance, Academic Press, San Diego, which is hereby incorporated by reference herein in its entirety):

$$\text{Log}Srel\log_t = \ln(Srel\log_t) = \ln\left(\ln\left(\frac{p_t^A}{p_t^B}\right)\right)$$

Effective Spread (See, e.g., Christie, W. G. & Schultz, P. H. (1998), 'Dealer markets under stress: The performance of NASDAQ® market makers during the Nov. 15, 1991, market break', Journal of Financial Services Research 13(3), 205-229, which is hereby incorporated by reference herein in its entirety):

$$Seff_t = |p_t - p_t^M|$$

Relative Effective Spread with Last Trade (See, e.g., Chordia, T., Roll, R. & Subrahmanyam, A. (2000), 'Commonality in liquidity', Journal of Financial Economics 56, 3-28, which is hereby incorporated by reference herein in its entirety):

$$Seffrelp_t = \frac{|p_t - p_t^M|}{p_t}$$

Relative Effective Spread with Mid-Price (See, e.g., Grammig, J., Schiereck, D. & Theissen, E. (2001), 'Knowing me, knowing you: Trader anonymity and informed trading in parallel markets', Journal of Financial Markets 4, 385-412, which is hereby incorporated by reference herein in its entirety):

$$SeffrelM_t = \frac{|p_t - p_t^M|}{p_t^M}$$

Quote Slope (See, e.g., Hasbrouck, J. & Seppi, D. J. (2001), 'Common factors in prices, order flows and liquidity', Journal of Financial Economics 59, 383-411, which is hereby incorporated by reference herein in its entirety):

$$QS_t = \frac{Sabs_t}{D\log_t} = \frac{p_t^A - p_t^B}{\ln(q_t^A) + \ln(q_t^B)}$$

Log Quote Slope (See, e.g., Hasbrouck, J. & Seppi, D. J. (2001), 'Common factors in prices, order flows and liquidity', Journal of Financial Economics 59, 383-411, which is hereby incorporated by reference herein in its entirety):

$$\text{Log}QS_t = \frac{Srel\log_t}{D\log_t} = \frac{\ln\left(\frac{p_t^A}{p_t^B}\right)}{\ln(q_t^A * q_t^B)}$$

Adjusted Log Quote Slope (See, e.g., Chordia, T., Roll, R. & Subrahmanyam, A. (2000), 'Commonality in liquidity', Journal of Financial Economics 56, 3-28, which is hereby incorporated by reference herein in its entirety):

$$\text{Log}QSadj_t = \frac{\ln\left(\frac{p_t^A}{p_t^B}\right)}{\ln(q_t^A * q_t^B)} + \frac{\left|\ln\left(\frac{q_t^B}{q_t^A}\right)\right|}{\ln(q_t^A * q_t^B)} * \ln\left(\frac{p_t^A}{p_t^B}\right)$$

Composite Liquidity (See, e.g., Chordia, T., Roll, R. & Subrahmanyam, A. (2000), 'Commonality in liquidity', Journal of Financial Economics 56, 3-28, which is hereby incorporated by reference herein in its entirety):

$$CL_t = \frac{SrelM_t}{D\$_t}$$

Liquidity Ratio (See, e.g., Elyasiani, E., Hauser, S. & Lauterbach, B. (2000), 'Market response to liquidity improvements: Evidence from exchange listings', The Financial Review 41, 1-14, which is hereby incorporated by reference herein in its entirety):

$$LR_t = \frac{V_t}{|r_t|}$$

Flow Ratio (See, e.g., Ranaldo, A. (2001), 'Intraday market liquidity on the Swiss stock exchange', Financial Markets and Portfolio Management 15(3), 309-327., which is hereby incorporated by reference herein in its entirety):

$$FR_t = \frac{V_t}{WT_t}$$

Order Ratio (See, e.g., Ranaldo, A. (2001), 'Intraday market liquidity on the Swiss stock exchange', Financial Markets and Portfolio Management 15(3), 309-327., which is hereby incorporated by reference herein in its entirety):

$$OR_t = \frac{|q_t^B - q_t^A|}{V_t}$$

Market Impact (See, e.g., Irvine, P., Benston, G. & Kandel, E. (2000), Liquidity beyond the inside spread: Measuring and using information in the limit order book, Working Paper, which is hereby incorporated by reference herein in its entirety):

$$MI_t^{V*} = p_t^{A,V*} - p_t^{B,V*}$$

Simple Vs. Composite Liquidity Risk Index

Note that any single liquidity measure, or a combination of several liquidity measures, could be converted into a market-wide liquidity risk index if it were calculated in real-time and then indexed using a weighting methodology that mirrors any well-known financial market index, such as the S&P500®, or a portfolio-specific index if real-time price, quote and transaction data were available for all securities holdings in the portfolio. A composite measure could be created which combines any number of liquidity measures by applying weights to the various measures, each weight having a possible value between −1 and 1, inclusively, such that the weights for the various measures for each stock (each underlying index component) collectively sum to a fixed number, whereby the weights are assigned arbitrarily or obtained through some optimization method or a signal extraction method such as a rolling or recursive Principal Components Analysis, which must performed in a rolling or recursive fashion in order to eliminate the look-ahead bias inherent in standard Principal Components Analysis. A second weighting must then be applied to aggregate all the individual index components into a liquidity risk index which is calculated in real-time and weighted identically to the well-known index (e.g., S&P500® weighting). Therefore, a double weighting procedure is applied to the liquidity measures in order to convert the liquidity measures into a liquidity risk index, whereby such calculation receives real-time price, quote, and transaction data such that the index can be calculated in real-time.

Index Weightings

Well-known financial market indices are weighted in a variety of ways. For example, the Dow Jones Industrial Average® is arithmetic average whereby the divisor is an arbitrary number. The S&P500® and the NASDAQ® Composite are weighted by market capitalization. The NASDAQ-100e Index is a modified market capitalization weighted index. The value of the Index equals the aggregate value of the Index share weights, also known as the Index Shares, of each of the Index Securities multiplied by each security's Last Sale Price, and divided by the divisor of the Index. The divisor serves the purpose of scaling such aggregate value to a lower order of magnitude which is more desirable for Index reporting purposes. The RUSSELL INDEXES® are weighted by market capitalization and a rule-based methodology whereby stocks are ranked from largest to smallest market capitalization at each year on May 31. The top 3,000 stocks become the Russell 3000 Index®, the largest 1,000 stocks become the Russell 1000 Index®, the next 2,000 stocks become the Russell 2000 Index®, and the smallest 1,000 in the Russell 2000 Index® plus the next smallest 1,000 comprise the Russell Microcap Index®.

The Barclays Capital Aggregate Bond Index® is a market-capitalization weighted index of corporate bonds, meaning the securities in the index are weighted according to the market size of each bond type. The S&P®/BGCANTOR® U.S. Treasury Bond Index is a broad, comprehensive, market-value weighted index that seeks to measure the performance of the U.S. Treasury Bond market. The US Dollar Index (USDX) is an index (or measure) of the value of the United States dollar relative to a basket of foreign currencies. It is a weighted geometric mean of the dollar's value compared only with:

Euro (EUR), 57.6% weight
Japanese yen (JPY) 13.6% weight
Pound sterling (GBP), 11.9% weight
Canadian dollar (CAD), 9.1% weight
Swedish krona (SEK), 4.2% weight and
Swiss franc (CHF) 3.6% weight Any of these index weighting methodologies may be applied to liquidity measures for each of the underlying securities in order to create a liquidity risk index mirroring the well-known index, or some other weighting may be applied to mirror another index, or some arbitrary weighting may be applied to create a novel index. Similarly the methodology could be applied to measure the particular liquidity risk in any individual portfolio of assets held by an investor, wherein portfolio weights are applied.

Thus, the method described above allows for the calculation of either a market-wide Liquidity Risk Index or a customized portfolio-specific Liquidity Risk Index in real-time in exemplary embodiments of the present disclosure.

B. Exemplary Network Environment

FIG. 1 illustrates an example environment in which exemplary embodiments of the present disclosure can be implemented. Relevant price, quote, volume data and other data can, for example, be stored on a relational database 20 (as are well known and provided by, for example, IBM®, Microsoft® Corporation, Oracle® and the like) associated with a computer system 10 provided with and running various computational hardware and software applications necessary to generate one or more indicators. Computer system 10 can include, for example, a microprocessor 30, which is understood to include various multiple core processors, various distributed processors, etc., memory (not shown), a storage medium (not shown), input devices (e.g., keyboard, mouse, microphone, etc.) 40, and one or more monitors 50. System 10 can, for example, be operated using a conventional operating system, and can include, for example, a graphical user interface for navigating and controlling various computational aspects of the present disclosure. System 10 can, for example, also be linked to one or more external data source servers 60 that feed system 10 with some or all of the necessary external data for computing the various indicators. Alternatively, as shown in FIG. 1, a stand-alone workstation 70, including a processor, memory, input devices and storage medium may be used to access database 20, or for example, a combination of database 20 and various external data source servers (not shown) akin to external data source servers 60.

Any suitable hardware and/or software can be used to perform the mechanisms described herein. For example, a general purpose device such as a computer or a special purpose device such as a client, a server, etc. can be used to execute software for performing the mechanisms described herein. Any of these general or special purpose devices can include any suitable components such as a hardware processor (which can be a microprocessor, digital signal processor, a controller, etc.), memory, communication interfaces, display controllers, input devices, etc. This hardware and/or software can be implemented as part of other equipment or can be implemented as stand-alone equipment (which can be coupled to other equipment).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

C. Exemplary Operation

Figure 2:
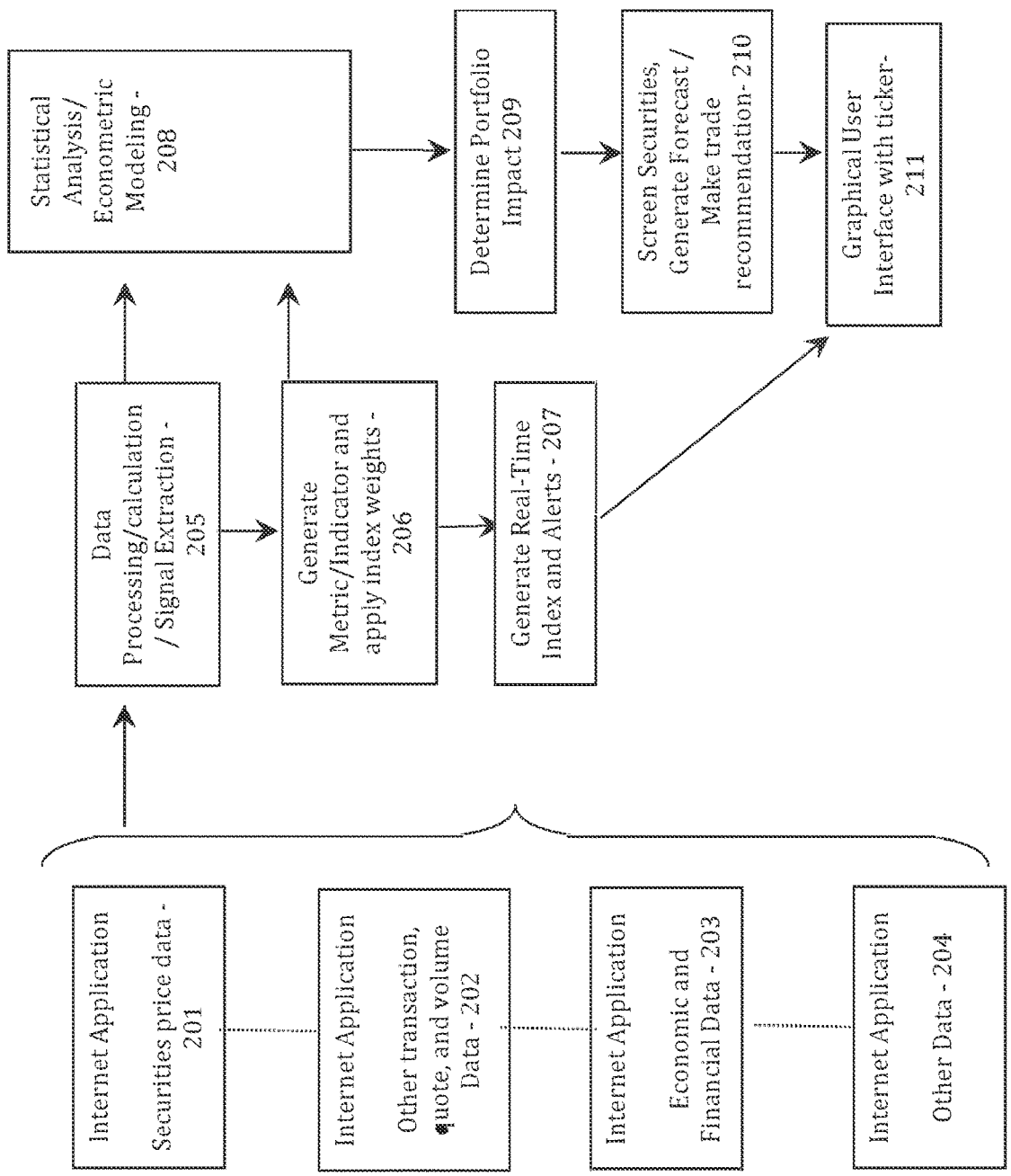
FIG. 2 is a schematic diagram illustrating the creation of a Liquidity Risk Index.

FIG. 2 illustrates a basic process according to exemplary embodiments of the present disclosure. In operation, a forecast, portfolio analysis or trade recommendation generated at 210 can analyze liquidity risk and forecast financial quantities in the following general manner. Forecast 210 can generate and/or receive parameters generated by portfolio impact 209 and statistical analysis/econometric modeling 208, which receives automatically, via a network, or manually entered by a user, a set of indicators at 206 which have been processed at 205 and/or receive directly other data which has been processed solely at 206. Data received at 206 can comprise data received from various Internet applications such as, but not limited to, securities prices and other asset data 201, other transaction, quote indication and volume data 202, economic and financial data 203, and/or other data 204. In the processing node at 205, the data are cleaned, transformed and normalized; primary liquidity measures are calculated and prepared for analysis. If a composite indicator is to be generated from multiple measures of liquidity, a signal is extracted from multiple liquidity measures at node 206. A real-time index and alerts is generated at 207 to notify a user if the level of liquidity risk has surpassed a predefined threshold, whereby such alert can be text (email, tweet, or SMS message), visual (a lightbulb changing colors), graphical, auditory (chimes, bells, etc.), or a scrolling ticker of values, levels, or changes (numerical or percent).

As noted above, where multiple liquidity measures are chosen to construct a composite indicator, such measures can be combined into one composite indicator by assigning weights to each data source after the data are processed and transformed accordingly, whereby the weights can range in value between −1 and 1, and must collectively sum to a fixed number. In exemplary embodiments of the present disclosure the weights can be assigned either arbitrarily or by some means of optimization, such as, for example, by applying a signal extraction algorithm to find the common signal among the various data. Signal extraction algorithm 206 can be, for example, a static, rolling, or recursive Principal Components Analysis which is an eigenvalue decomposition of a covariance or correlation matrix, or a matrix of pairwise correlations and covariances, or a method such as a Kalman Filter, or the Wiener-Kolmogorov (WK) signal extraction formulae, or some other method which modifies or incorporates elements of one or several well-known optimization or signal extraction techniques, such as the hybrid MPCA-KF signal extraction algorithm described in commonly-owned, commonly-assigned U.S. patent application Ser. No. 13/677,273, entitled "METHODS AND SYSTEMS TO CREATE SYNTHETIC VARIABLES, INDICATORS AND INDICES FROM MULTIPLE DATA AND METADATA SOURCES AND RISK MANAGEMENT CONTRACTS THEREON," which was filed on even date herewith. It is understood that such signal extraction methods may need to be modified due to the unique properties of this type of data. In exemplary embodiments of the present disclosure it is also possible to employ various signal extraction techniques in order to construct various candidate indicators, composite indicators, or indices and then select the indicator or index which results in the lowest forecast error of estimated parameters, i.e., select the indicator or index which results in the best forecast.

In exemplary embodiments of the present disclosure an example system can offer as a choice several well-known optimization or signal extraction algorithms, the hybrid MPCA-KF algorithm described in above-mentioned U.S. patent application Ser. No. 13/677,273, entitled "METHODS AND SYSTEMS TO CREATE SYNTHETIC VARIABLES, INDICATORS AND INDICES FROM MULTIPLE DATA AND METADATA SOURCES AND RISK MANAGEMENT CONTRACTS THEREON," or some other hybrid or modified optimization or signal extraction method. All possible optimization or signal extraction methods can be applied concurrently in order to identify the method that results in the lowest forecast error or the highest predictive power. An example system can run several signal extraction algorithms at once to generate candidate indices or indicators. These candidate variables can then be tested concurrently in a statistical or econometric forecasting model. The example system can then automatically identify the candidate indicator that produces the lowest forecast error or the highest predictive power, and recommend that indicator as a suitable indicator to the user.

The resulting composite liquidity risk indicator generated at 206 can be a linear combination of the various liquidity measures, such as a weighted average, or some other linear combination, whereby the weights assigned to each data source can range in value from −1 to 1, inclusively, and collectively sum to a fixed number. At 206 the single liquidity measure or composite liquidity measure is applied to each underlying security index component in a well-known financial market index and then the index weights are applied to all securities such that an index is formed which has the same composition as the well-known index.

Figure 3:
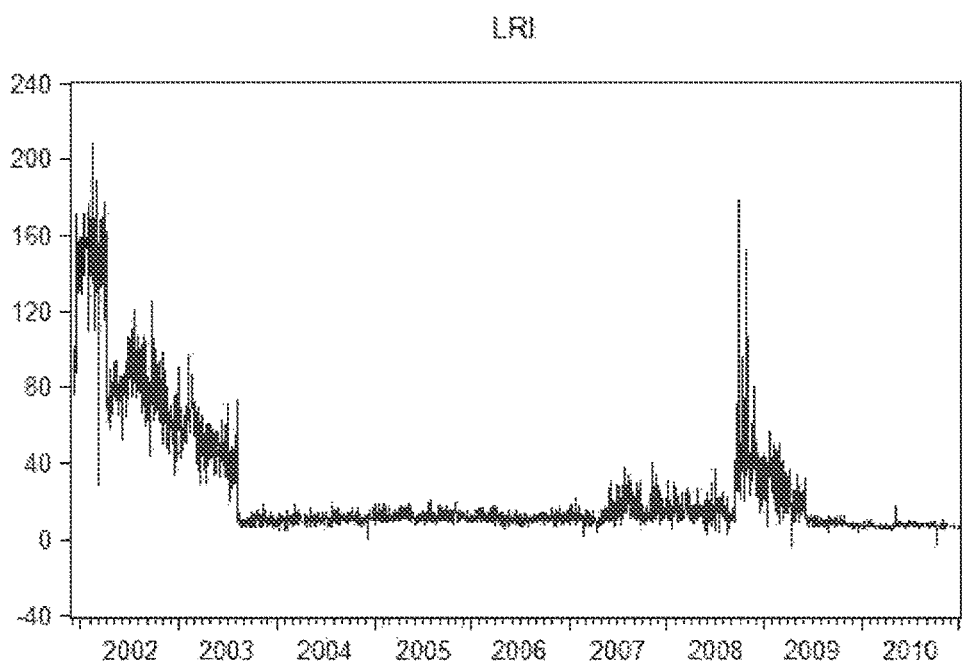
FIG. 3 depicts an exemplary graphical display of a Liquidity Risk Index.

FIG. 3 depicts exemplary an exemplary Liquidity Risk Index for the Dow Jones Industrial Average® over time.

A graph can represent data such as, the liquidity risk index for the Dow Jones Industrial Average® trending over time, as shown in FIG. 3. With reference thereto, FIG. 3 depicts an exemplary graphical display of a liquidity risk index. It is understood that such graphical depiction may also include one or more of the following:
  (i) calculating and displaying how the liquidity risk trends over time;
  (ii) calculating and displaying how the liquidity risk varies by individual securities, groups of securities or assets in a portfolio,
  (iii) calculating and displaying how the liquidity risk index concurrently trends over time and varies by groups of securities or assets in a portfolio, in order to determine if trends are similar or different among different actual or hypothetical groups of securities in a portfolio;
  (iv) calculating and displaying an overall volume of liquidity risk in financial markets per unit of time;
  (v) calculating and displaying how said liquidity risk trends over time and would vary by changing the composition of a portfolio;
  (vi) calculating and displaying the liquidity risk of certain securities or assets, relative to other financial or economic risks;
  (vii) calculating and displaying the liquidity risk of certain securities or assets relative to other subject matter in the same category.

It is also understood that exemplary graphical display may be accompanied by or include the capacity to generate real-time graphical, numerical, visual or textual alerts regarding current or expected liquidity risk in financial markets or of certain securities or assets in a portfolio, wherein said alerts can be in the form of a scrolling ticker displaying levels or changes (numerical or percent) of liquidity risk index, or generating an alert when the liquidity risk index surpasses some threshold, wherein said defined threshold level is 5% or some other quantity greater than the average daily liquidity risk, and, wherein the real-time alerts are based on user-configurable conditions or parameters including one or more of:
  (i) abnormally positive liquidity risk levels;
  (ii) abnormally negative liquidity risk levels;
  (iii) changes in liquidity risk levels above or below a pre-selected threshold;

It is also understood that such a system utilizes a graphical user interface comprising a unique combination of (i) data calculation capabilities, (ii) statistical and econometric analysis and (iii) graphical reporting tools to measure and index liquidity risk in a portfolio, or financial markets generally, and recommending trades or asset substitutions in a portfolio to change the liquidity risk profile of the portfolio, (iv) a scrolling ticker.

It is also understood that such a system may display in a graphical user interface one or more visualizations of analytic measurements of liquidity risk.

Such a system may further comprise displaying one or more of: How liquidity risk:
  (i) trends over time,
  (ii) varies by groups of securities or assets in a portfolio or financial markets at large, and
  (iii) concurrently trends over time and varies by groups of securities or assets in a portfolio or financial markets at large.

It is also understood that such a system may comprise displaying liquidity risk, in comparison to other benchmark indices or other risks, such as volatility, correlation, or sentiment, or historical returns on an index, asset class, or individual security. Additionally, such a system may comprise liquidity risk, in comparison to the consensus view of current or future economic conditions or asset prices.

Such a system may further comprise displaying how liquidity risk concerning any user-configurable collection of securities or assets trends over a user-configurable time period, geographical region, industry group, or style category.

It is understood that such a system may further comprise a graphical user interface that allows a user to configure parameters, such as a wizard which prompts the user to set parameters by which the system calculates, delivers, and displays liquidity risk metric for such a user-configurable measure. In addition, such a system may further read portfolio data such as holdings from an online source of account data, such as from an online brokerage account and generate recommendations. Alternatively, the system may accept manual inputs of portfolio holdings data, or accept such data by means of file upload from a format such as Excel or ascii.

To further concretize the above discussion, an example calculation of a liquidity risk index is next described.

Example 6—Liquidity Risk Index and Method of Hedging Liquidity Risk

An index of liquidity risk for a certain asset class can be created, as well as an overall level of liquidity risk in financial markets. In the case of one asset class, the indicator can be calculated as follows, for example for an index of equities, such as the S&P500®.

Measure of liquidity risk is converted to an aggregate market-wide index measure which can be calculated in real-time. However, note that a composite measure could be created which combines any number of liquidity indicators by applying weights to the various measures, such weights ranging in value between −1 and 1, inclusively, and collectively summing to a fixed number, whereby the weights are assigned arbitrarily or obtained through some optimization method or a signal extraction method such as a rolling or recursive Principal Components Analysis, which must performed in a rolling or recursive fashion in order to eliminate the look-ahead bias inherent in standard Principal Components Analysis. A second weighting procedure using pre-defined index weighting methodology would convert the composite liquidity measures for each security to an aggregate market-wide liquidity risk index.

Let the difference between the lowest Ask price at time t, $P_t^A$, and the highest Bid price at time t, $P_t^B$ for stock $X_t$ be called the spread, calculated as follows:

$$Spread_x = P_t^A - P_t^B$$

Let the ratio of the spread for stock X, relative to the last transaction price, $P_t^L$ executed for stock $X_t$ measure the liquidity risk for stock $X_t$:

$$L_t^X = \frac{(P_t^A - P_t^B)}{P_t^L}$$

It is noted that as an alternate to the last transaction price, a mid-price can be calculated whereby the midprice, $P_t^M$, is equal to the sum of the bid and ask divided by two, i.e., $$P_t^M = \frac{(P_t^A - P_t^B)}{2}$$

In this case, $$L_t^X = \frac{(P_t^A - P_t^B)}{P_t^M}$$

or $$L_t^X = 2 * \frac{(P_t^A - P_t^B)}{(P_t^A + P_t^B)}$$

It is noted that as an alternate to the last transaction price or the mid-price, the volume-weighted average price (VWAP) at time t, $P_t^{VWAP}$ can also be used. In this case we have:

$$L_t^X = \frac{(P_t^A - P_t^B)}{P_t^{VWAP}}$$

Alternatively, the volume-weighted average bid and ask prices can be used as well, $$L_t^X = \frac{(P_t^{AVWAP} - P_t^{BVWAP})}{P_t^{VWAP}}$$

In the case of daily data the closing bid, ask, and last sale price would be used.

$$L_t^X = \frac{(P_t^{CA} - P_t^{CB})}{P_t^{CL}}$$

Alternatively, any combination of liquidity measures maybe applied to form a composite liquidity measure which is then converted to an index by applying an index-weighting methodology.

It is noted that for any of these measures, the log could be taken, which would improve the distributional qualities, or an absolute value measure could also be used, or some other mathematical or statistical transformation could be applied.

It is noted that any of the liquidity measures can be adjusted by a multiplier M and/or a scalar S. It is understood that the multiplier M and scalar S may take on any value, including 1 and 0, respectively.

Note that normalizing the spread with price in the denominator (last transaction, mid-price, VWAP, closing price, etc.) facilitates comparability across stocks.

A Liquidity Risk Index can be calculated as a counterpart to any well-known financial market index. For example, a liquidity risk index for the S&P500® could be calculated as follows:

Let $w_{xi}$ represent the market capitalization weight of stock $X_i$ which is the i-th index component in the S&P500® index. That is, let $$w_{xi} = \frac{P_{xi} S_{xi}}{\sum_{i=1}^{500} P_{xi} S_{xi}}$$

where
$P_{xi}$=Price of stock $X_i$ the i-th index component
$S_{xi}$=Float-adjusted shares outstanding of stock $X_i$, the i-th index component Then an index of liquidity risk for the S&P500® can be calculated as follows:

$$LRI_{S\&P} = \sum_{i=1}^{500} w_{xi} \sum_{j=1}^{n} w_{j,xi} L_{j,xi} * M + S$$

where $w_{xi}$ are index weights for each security $x_i$, $w_{j,xi}$ are weights for any j of n liquidity measures $L_{j,xi}$ for each security $x_i$, whereby such weights for the liquidity measures can range between −1 and 1 inclusively and must collectively sum to a fixed number, M is a multiplier and S is a scalar. It is understood that the multiplier M and scalar S may take on any value, including 1 and 0, respectively. This equation illustrates the double-weighting procedure.

Since the S&P500® is calculated in real-time, the Liquidity Risk Index for the S&P500® can also be calculated in real-time, provided that price, quote, and transaction data are available in real-time.

A similar construction can be used for a Liquidity Risk Index for the Dow Jones Industrial Average® (DJIA®), which is a price-weighted index whereby the sum of the component stock prices for each stock $X_t$ is divided by a Divisor, d, which adjusts the index for stock splits, spinoffs, and other structural changes. Thus, the DJIA® is calculated as:

$$DJIA = \frac{\sum_{i=1}^{30} P_{xi}}{d}$$

The current value of the divisor is d=0.132129493
In this case, the Liquidity Risk Index for the DJIA® is given by:

$$LRI_{DOW} = \frac{\sum_{i=1}^{30} L_{xi}}{d}$$

Since the DJIA® is calculated in real-time, the Liquidity Risk Index for the DJIA® can also be calculated in real-time, provided that price, quote, and transaction data are available in real-time.

It is noted that a similar construction could be utilized to create a liquidity risk index LRI for US corporate bonds, such as a measure of liquidity risk corresponding to a bond index such as the NASD-Bloomberg® Active Investment Grade U.S. Corporate Bond Index, or for Chinese corporate bonds using the S&P®/CITIC Corporate Bond Index. The S&P®/CITIC Corporate Bond Index is one of five distinct fixed indices designed to track China's government corporate, inter-bank, and convertible bond markets. It includes all corporate bonds listed on either SSE or SZSE. All exchange-traded bonds with terms to maturity above one year, fixed coupon rate including zero coupon bonds that detach at maturity, par outstanding above 100 million RMB, and an investment grade credit rating are included in the index. Since the S&P®/CITIC index is calculated real-time, the Liquidity Risk Index for Chinese corporate bonds could also be calculated in real time.

Similarly, a liquidity risk index LRI can be calculated in the market for foreign exchange, where a liquidity risk measure is calculate from the bid-ask spread quoted for n currency pairs, and a liquidity risk measure can be calculated for each unique currency pairs, where for n currencies there exist n(n−1)/2 unique currency pairs, and in addition a composite liquidity risk index LRI can be calculated for a all currency pairs or a subset of currency pairs, such as for the DXY dollar index.

Similarly, a liquidity risk index can be created for emerging market equities, mirroring the components and weights, for example, of the MSCI index.

In the case an overall liquidity risk index for the economy or the financial markets, a composite indicator can be created by determining weights for the liquidity risk corresponding to each asset and a linear combination of these liquidity risk measures combine to create an overall measure of liquidity risk for an asset class or a group of assets in financial markets.

A liquidity risk index LRI can be calculated for any individual security, portfolio, collection of securities, asset class or collection assets.

Derivative instruments—futures, options, and options on futures—can be issued to track the value of each underlying liquidity metric, as well as the composite or aggregate LRI, allowing financial market participants to speculate on the value of the liquidity indicator for each security. Similarly, an Exchange Traded Fund or other financial instruments can be created to track the value of the index. As the price of each underlying contract on liquidity changes, the LRI would change value in real time as the prices of the underlying assets change. Derivative instruments—futures, options, and options on futures or other financial instruments—can be issued to track the value of the liquidity risk index, providing market participants with a method to hedge the liquidity risk for assets in a portfolio.

Sample code—Eviews program to calculate liquidity risk for DJIA®

'Liquidity Risk Index for Dow Jones Industrial Average® (DJIA®), monthly data from December 2001-December 2010

'and Granger Causality Tests to determine liquidity measure's predictive power for future returns on the DJIA®

'See Excel data files: dow_01032012_REVERSED_FINAL.xls and GC test_pvals_01062012.xls 'Since index components change occasionally, the securities are first designated as either constant (C), or Switch (S) series to reflect index component changes over time.

'First, rename the series so that X goes from 1 to 30

| | |
|---|---|
| series CLO_X1 | = CLO_C1 |
| series BID_X1 | = BID_C1 |
| series ASK_X1 | = ASK_C1 |
| series VOL_X1 | = VOL_C1 |
| series CLO_X2 | = CLO_C2 |
| series BID_X2 | = BID_C2 |
| series ASK_X2 | = ASK_C2 |
| series VOL_X2 | = VOL_C2 |
| series CLO_X3 | = CLO_C3 |
| series BID_X3 | = BID_C3 |
| series ASK_X3 | = ASK_C3 |
| series VOL_X3 | = VOL_C3 |
| series CLO_X4 | = CLO_C4 |
| series BID_X4 | = BID_C4 |
| series ASK_X4 | = ASK_C4 |
| series VOL_X4 | = VOL_C4 |
| series CLO_X5 | = CLO_C5 |
| series BID_X5 | = BID_C5 |
| series ASK_X5 | = ASK_C5 |
| series VOL_X5 | = VOL_C5 |
| series CLO_X6 | = CLO_C6 |
| series BID_X6 | = BID_C6 |
| series ASK_X6 | = ASK_C6 |
| series VOL_X6 | = VOL_C6 |
| series CLO_X7 | = CLO_C7 |
| series BID_X7 | = BID_C7 |
| series ASK_X7 | = ASK_C7 |
| series VOL_X7 | = VOL_C7 |
| series CLO_X8 | = CLO_C8 |
| series BID_X8 | = BID_C8 |
| series ASK_X8 | = ASK_C8 |
| series VOL_X8 | = VOL_C8 |
| series CLO_X9 | = CLO_C9 |
| series BID_X9 | = BID_C9 |
| series ASK_X9 | = ASK_C9 |
| series VOL_X9 | = VOL_C9 |
| series CLO_X10 | = CLO_C10 |
| series BID_X10 | = BID_C10 |
| series ASK_X10 | = ASK_C10 |
| series VOL_X10 | = VOL_C10 |
| series CLO_X11 | = CLO_C11 |
| series BID_X11 | = BID_C11 |
| series ASK_X11 | = ASK_C11 |
| series VOL_X11 | = VOL_C11 |
| series CLO_X12 | = CLO_C12 |
| series BID_X12 | = BID_C12 |
| series ASK_X12 | = ASK_C12 |
| series VOL_X12 | = VOL_C12 |
| series CLO_X13 | = CLO_C13 |
| series BID_X13 | = BID_C13 |
| series ASK_X13 | = ASK_C13 |
| series VOL_X13 | = VOL_C13 |
| series CLO_X14 | = CLO_C14 |
| series BID_X14 | = BID_C14 |
| series ASK_X14 | = ASK_C14 |
| series VOL_X14 | = VOL_C14 |
| series CLO_X15 | = CLO_C15 |
| series BID_X15 | = BID_C15 |
| series ASK_X15 | = ASK_C15 |
| series VOL_X15 | = VOL_C15 |
| series CLO_X16 | = CLO_C16 |
| series BID_X16 | = BID_C16 |
| series ASK_X16 | = ASK_C16 |
| series VOL_X16 | = VOL_C16 |
| series CLO_X17 | = CLO_C17 |
| series BID_X17 | = BID_C17 |
| series ASK_X17 | = ASK_C17 |
| series VOL_X17 | = VOL_C17 |
| series CLO_X18 | = CLO_C18 |
| series BID_X18 | = BID_C18 |
| series ASK_X18 | = ASK_C18 |
| series VOL_X18 | = VOL_C18 |
| series CLO_X19 | = CLO_C19 |
| series BID_X19 | = BID_C19 |

| | |
|---|---|
| series ASK_X19 | = ASK_C19 |
| series VOL_X19 | = VOL_C19 |
| series CLO_X20 | = CLO_C20 |
| series BID_X20 | = BID_C20 |
| series ASK_X20 | = ASK_C20 |
| series VOL_X20 | = VOL_C20 |
| series CLO_X21 | = CLO_C21 |
| series BID_X21 | = BID_C21 |
| series ASK_X21 | = ASK_C21 |
| series VOL_X21 | = VOL_C21 |
| series CLO_X22 | = CLO_C22 |
| series BID_X22 | = BID_C22 |
| series ASK_X22 | = ASK_C22 |
| series VOL_X22 | = VOL_C22 |
| series CLO_X23 | = CLO_S1 |
| series BID_X23 | = BID_S1 |
| series ASK_X23 | = ASK_S1 |
| series VOL_X23 | = VOL_S1 |
| series CLO_X24 | = CLO_S2 |
| series BID_X24 | = BID_S2 |
| series ASK_X24 | = ASK_S2 |
| series VOL_X24 | = VOL_S2 |
| series CLO_X25 | = CLO_S3 |
| series BID_X25 | = BID_S3 |
| series ASK_X25 | = ASK_S3 |
| series VOL_X25 | = VOL_S3 |
| series CLO_X26 | = CLO_S4 |
| series BID_X26 | = BID_S4 |
| series ASK_X26 | = ASK_S4 |
| series VOL_X26 | = VOL_S4 |
| series CLO_X27 | = CLO_S5 |
| series BID_X27 | = BID_S5 |
| series ASK_X27 | = ASK_S5 |
| series VOL_X27 | = VOL_S5 |
| series CLO_X28 | = CLO_S6 |
| series BID_X28 | = BID_S6 |
| series ASK_X28 | = ASK_S6 |
| series VOL_X28 | = VOL_S6 |
| series CLO_X29 | = CLO_S7 |
| series BID_X29 | = BID_S7 |
| series ASK_X29 | = ASK_S7 |
| series VOL_X29 | = VOL_S7 |
| series CLO_X30 | = CLO_S8 |
| series BID_X30 | = BID_S8 |
| series ASK_X30 | = ASK_S8 |
| series VOL_X30 | = VOL_S8 |

'generate series and do calculation series LIQ_$X1$=((ASK_$X1$−BID_$X1$)/CLO_$X1$)*100 series LIQ_$X2$=((ASK_$X2$−BID_$X2$)/CLO_$X2$)*100 series LIQ_$X3$=((ASK_$X3$−BID_$X3$)/CLO_$X3$)*100 series LIQ_$X4$=((ASK_$X4$−BID_$X4$)/CLO_$X4$)*100 series LIQ_$X5$=((ASK_$X5$−BID_$X5$)/CLO_$X5$)*100 series LIQ_$X6$=((ASK_$X6$−BID_$X6$)/CLO_$X6$)*100 series LIQ_$X7$=((ASK_$X7$−BID_$X7$)/CLO_$X7$)*100 series LIQ_$X8$=((ASK_$X8$−BID_$X8$)/CLO_$X8$)*100 series LIQ_$X9$=((ASK_$X9$−BID_$X9$)/CLO_$X9$)*100 series LIQ_$X10$=((ASK_$X10$−BID_$X10$)/CLO_$X10$)*100 series LIQ_$X11$=((ASK_$X11$−BID_$X11$)/CLO_$X11$)*100 series LIQ_$X12$=((ASK_$X12$−BID_$X12$)/CLO_$X12$)*100 series LIQ_$X13$=((ASK_$X13$−BID_$X13$)/CLO_$X13$)*100 series LIQ_$X14$=((ASK_$X14$−BID_$X14$)/CLO_$X14$)*100 series LIQ_$X15$=((ASK_$X15$−BID_$X15$)/CLO_$X15$)*100 series LIQ_$X16$=((ASK_$X16$−BID_$X16$)/CLO_$X16$)*100 series LIQ_$X17$=((ASK_$X17$−BID_$X17$)/CLO_$X17$)*100 series LIQ_$X18$=((ASK_$X18$−BID_$X18$)/CLO_$X18$)*100 series LIQ_$X19$=((ASK_$X19$−BID_$X19$)/CLO_$X19$)*100 series LIQ_$X20$=((ASK_$X20$−BID_$X20$)/CLO_$X20$)*100 series LIQ_$X21$=((ASK_$X21$−BID_$X21$)/CLO_$X21$)*100 series LIQ_$X22$=((ASK_$X22$−BID_$X22$)/CLO_$X22$)*100 series LIQ_$X23$=((ASK_$X23$−BID_$X23$)/CLO_$X23$)*100 series LIQ_$X24$=((ASK_$X24$−BID_$X24$)/CLO_$X24$)*100 series LIQ_$X25$=((ASK_$X25$−BID_$X25$)/CLO_$X25$)*100 series LIQ_$X26$=((ASK_$X26$−BID_$X26$)/CLO_$X26$)*100 series LIQ_$X27$=((ASK_$X27$−BID_$X27$)/CLO_$X27$)*100 series LIQ_$X28$=((ASK_$X28$−BID_$X28$)/CLO_$X28$)*100 series LIQ_$X29$=((ASK_$X29$−BID_$X29$)/CLO_$X29$)*100 series LIQ_$X30$=((ASK_$X30$−BID_$X30$)/CLO_$X30$)*100

'calculate Liquidity Risk Index AND divide by Dow divisor series LRI_L=(LIQ_$X1$+LIQ_$X2$+LIQ_$X3$+LIQ_$X4$+
LIQ_$X5$+LIQ_$X6$+LIQ_$X7$+LIQ_$X8$+LIQ_$X9$+
LIQ_$X10$+LIQ_$X11$+LIQ_$X12$+LIQ_$X13$+
LIQ_$X14$+LIQ_$X15$+LIQ_$X16$+LIQ_$X17$+
LIQ_$X18$+LIQ_$X19$+LIQ_$X20$+LIQ_$X21$+
LIQ_$X22$+LIQ_$X23$+LIQ_$X24$+LIQ_$X25$+
LIQ_$X26$+LIQ_$X27$+LIQ_$X28$+LIQ_$X29$+
LIQ_$X30$)/DIV 'DIV is time series of Dow Jones Industrial Average® Divisor
'calculate liquidity risk index percent change series LRI_C=@pc(LRI_L)

'form group of DJIA percent change and LRI percent change group dowliq *djia_c_lri_c*

'make table to hold lag pvals table(48,2)*gc_pvals*

```
gc_pvals(1,1)="DJIA_P"

gc_pvals(1,2)="LRI_P"

!row=2
'do Granger Causality to determine whether changes in
    Liquidity risk Granger causes DJIA returns
'specify lag variable
    for !lag=1 to 47
'do Granger test
    freeze(gc_!lag)dowliq.cause(!lag)

'identify results to extract
    scalar LRI_P=@val(gc_!lag(8,4))

scalar DJIA_P=@val(gc_!lag(9,4))
'extract to table
    gc_pvals(!row,1)=DJIA_P gc_pvals(!row,2)=LRI_P
'tell it to fill each row
    !row=!row+1 next
```

| Company | 12.01.01-04.07.04 | 04.08.04-11.20.05 | 11.21.05-02.18.08 |
|---|---|---|---|
| AT&T, AIG, Kraft Foods | T | AIG | AIG |
| Eastman Kodak, Pfizer Inc. | EK | PFE | PFE |
| International Paper Company, Veriz | IP | VZ | VZ |
| SBC Communications, AT&T | SBC | SBC | T |
| Altria Group, Bank of America | MO | MO | MO |
| Honeywell International Inc., Chevr | HON | HON | HON |
| Citigroup, Cisco Systems | C | C | C |
| General Motors, Travelers Cos. | GM | GM | GM |
| 3M Co. | MMM | MMM | MMM |
| Alcoa Inc. | AA | AA | AA |
| American Express Co. | AXP | AXP | AXP |
| Boeing Co. | BA | BA | BA |
| Caterpillar Inc. | CAT | CAT | CAT |
| Coca-Cola Co. | KO | KO | KO |
| E.I. DuPont de Nemours & Co. | DD | DD | DD |
| Exxon Mobil Corp. | XOM | XOM | XOM |
| General Electric Co. | GE | GE | GE |
| Hewlett-Packard Co. | HPQ | HPQ | HPQ |
| Home Depot Inc. | HD | HD | HD |
| Intel Corp. | INTC | INTC | INTC |
| International Business Machines Co | IBM | IBM | IBM |
| Johnson & Johnson | JNJ | JNJ | JNJ |
| JPMorgan Chase & Co. | JPM | JPM | JPM |
| McDonald's Corp. | MCD | MCD | MCD |
| Merck & Co. Inc. | MRK | MRK | MRK |
| Microsoft Corp. | MSFT | MSFT | MSFT |
| Procter & Gamble Co. | PG | PG | PG |
| United Technologies Corp. | UTX | UTX | UTX |
| Wal-Mart Stores Inc. | WMT | WMT | WMT |
| Walt Disney Co. | DIS | DIS | DIS |

| Company | 02.19.08-09.21.08 | 09.22.08-06.07.09 | 06.08.09-present | |
|---|---|---|---|---|
| AT&T, AIG, Kraft Foods | AIG | KFT | KFT | S1 |
| Eastman Kodak, Pfizer Inc. | PFE | PFE | PFE | S2 |
| International Paper Company, Veriz | VZ | VZ | VZ | S3 |
| SBC Communications, AT&T | T | T | T | S4 |
| Altria Group, Bank of America | BAC | BAC | BAC | S5 |
| Honeywell International Inc., Chevr | CVX | CVX | CVX | S6 |
| Citigroup, Cisco Systems | C | C | TRV | S7 |
| General Motors, Travelers Cos. | GM | GM | CSCO | S8 |
| 3M Co. | MMM | MMM | MMM | C1 |
| Alcoa Inc. | AA | AA | AA | C2 |
| American Express Co. | AXP | AXP | AXP | C3 |
| Boeing Co. | BA | BA | BA | C4 |
| Caterpillar Inc. | CAT | CAT | CAT | C5 |
| Coca-Cola Co. | KO | KO | KO | C6 |
| E.I. DuPont de Nemours & Co. | DD | DD | DD | C7 |
| Exxon Mobil Corp. | XOM | XOM | XOM | C8 |
| General Electric Co. | GE | GE | GE | C9 |
| Hewlett-Packard Co. | HPQ | HPQ | HPQ | C10 |
| Home Depot Inc. | HD | HD | HD | C11 |
| Intel Corp. | INTC | INTC | INTC | C12 |
| International Business Machines Co | IBM | IBM | IBM | C13 |
| Johnson & Johnson | JNJ | JNJ | JNJ | C14 |

-continued

| | | | | |
|---|---|---|---|---|
| JPMorgan Chase & Co. | JPM | JPM | JPM | C15 |
| McDonald's Corp. | MCD | MCD | MCD | C16 |
| Merck & Co. Inc. | MRK | MRK | MRK | C17 |
| Microsoft Corp. | MSFT | MSFT | MSFT | C18 |
| Procter & Gamble Co. | PG | PG | PG | C19 |
| United Technologies Corp. | UTX | UTX | UTX | C20 |
| Wal-Mart Stores Inc. | WMT | WMT | WMT | C21 |
| Walt Disney Co. | DIS | DIS | DIS | C22 |

What is claimed:

1. A computer-implemented method for quantifying liquidity risk of a plurality of assets in at least one financial market, the method comprising:
   accessing data associated with the plurality of assets for a time period;
   determining, based at least in part on the accessed data, a plurality of determined liquidity indicators, wherein at least one determined liquidity indicator from the plurality of determined liquidity indicators corresponds to at least one asset from the plurality of assets and the plurality of determined liquidity indicators comprise an estimate of liquidity for the at least one asset;
   generating, a plurality of quantified liquidity risk indicators based on a transformation of one or more of the plurality of determined liquidity indicators, wherein at least one quantified liquidity risk indicator from the plurality of quantified liquidity risk indicators corresponds to an asset from the plurality of assets in the at least one financial market and comprises a ratio of two determined liquidity indicators;
   accessing additional data associated with the plurality of assets for an updated time period;
   updating in real-time or based on a user-configurable time period a plurality of values of the plurality of quantified liquidity risk indicators using the additional data based on repeating the determining and the generating; and
   displaying, via a graphical user interface, at least one quantified liquidity risk indicator from the plurality of quantified liquidity risk indicators.

2. The method of claim 1, wherein the ratio of two determined liquidity indicators comprises a first determined liquidity indicator that comprises a projected price volatility and a second determined liquidity indicator that comprises a projected trading volume capacity.

3. The method of claim 1, wherein at least one determined liquidity indicator from the plurality of determined liquidity indicators further comprises at least one of a projected days to liquidate; a projected days to cash conversion; a projected market price impact; and an estimated transaction cost.

4. The method of claim 1, wherein at least one determined liquidity indicator is associated with a category of liquidity for the at least one determined liquidity indicator.

5. The method of claim 4, wherein the category comprises at least one of a relative level and an absolute level of liquidity of the at least one asset.

6. The method of claim 1, further comprising: generating a ranking based on the ratio, wherein the ranking compares the ratio to at least one additional ratio for at least one additional asset in the at least one financial market.

7. The method of claim 1, wherein the at least one quantified liquidity risk indicator comprises a metric comprising at least one of:
   at least one category for the at least one asset;
   a score based on the ratio of two determined liquidity indicators;
   a rank ordering of scores corresponding to assets in the at least one financial market;
   an analysis of a stress testing or a stress scenario for the at least one asset in the plurality of assets under a variety of conditions;
   a comparative score for the at least one asset that compares to at least one of another asset, a universe of assets, an asset class, an industry, and a sector;
   a liquidity risk gauge comprising trends of the quantified liquidity risk indicators for at least one asset over a period of time;
   a minimum metric for a level of liquidity corresponding to at least one asset from the plurality of assets;
   a maximum metric for level of liquidity corresponding to at least one asset from the plurality of assets; and
   a comparison metric for a level of liquidity corresponding to at least one asset from the plurality of assets compared to a level of liquidity corresponding to another asset from the plurality of assets.

8. The method of claim 1, wherein the displaying the at least one quantified liquidity risk indicator further comprises:
   displaying at least one of a projected time to liquidate for at least one asset from the plurality of assets; a projected market price impact for at least one asset from the plurality of assets; a score for the at least one quantified liquidity risk indicator for at least one asset from the plurality of assets; information related to a stress analysis based on the at least one quantified liquidity risk indicator for at least one asset from the plurality of assets; the accessed data for at least one asset from the plurality of assets; the accessed additional data for at least one asset from the plurality of assets; information on a portfolio comprising the at least one asset from the plurality of assets; information on a position size related to the at least one asset from the plurality of assets; an alert for a level of the at least one quantified liquidity risk indicator for at least one asset from the plurality of assets; and a report based on a quantified liquidity risk indicator for at least one asset from the plurality of assets.

9. The method of claim 1, wherein the accessed data comprises data having an unstructured format and the determining at least one liquidity indicator corresponding to the at least one asset based at least in part on the accessed data comprises processing the data having an unstructured format into the at least one determined liquidity indicator.

10. The method of claim 9, wherein the processing comprises applying at least one of a semantic filter, a natural language processing, and a machine learning technique.

11. The method of claim 1, wherein the accessed data comprises data having a structured format and the determining at least one liquidity indicator corresponding to the at least one asset based at least in part on the accessed data comprises processing the data having an structured format into the at least one determined liquidity indicator.

12. The method of claim 11, wherein the processing comprises applying at least one of cleaning, normalizing, and estimating missing data.

13. The method of claim 1, wherein the at least one determined liquidity indicator comprises a transaction cost metric.

14. The method of claim 13, wherein the transaction cost metric comprises a cost score that provides a trade-by-trade measure of relative quality of a transaction.

15. The method of claim 14, wherein the cost score comprises a percentile within a given statistical distribution.

16. The method of claim 14, wherein the transaction cost metric is associated with at least one of a proposed trade price and an indicated trade price.

17. The method of claim 1, wherein the estimate is a result of at least one of an econometric model and a statistical analysis.

18. The method of claim 1, further comprising:
monitoring the at least one quantified liquidity risk indicator from the plurality of quantified liquidity risk indicators; and
determining one of the following based on the monitored at least one quantified liquidity risk indicator: (i) a cost to implement a trading strategy for the at least one asset, (ii) a length of time for execution of a transaction for the at least one asset, (iii) whether a trade for a certain type of asset within the at least one financial market was executed faster than for another type of asset within the at least one financial market; (iv) an adjustment to the at least one quantified liquidity risk indicator for a geographic region or a currency.

19. The method of claim 1, wherein the ratio for the at least one asset is based on an interaction between a projected price volatility and a projected trade volume capacity.

20. The method of claim 1, wherein the displaying further comprises displaying the ratio.

21. The method of claim 1, wherein the ratio comprises an average ratio for at least one of a class of assets, a group of assets, an industry within the at least one financial market, a sector within the at least one financial market, and a segment of the at least one financial market.

22. The method of claim 1, wherein the displaying further comprises displaying at least one of a ranking of the at least one quantified liquidity risk indicator, a liquidity risk score, a liquidity risk rank, a projected price volatility, a projected trading volume capacity, a liquidity risk calculator, a projected days to liquidate, a projected days to cash conversion, a liquidity bucket, a projected market price impact, an estimated transaction cost, a target days to liquidate, and a target market price impact for at least one asset from the plurality of assets.

23. The method of claim 1, further comprising: generating a liquidity risk index for the at least one financial market, wherein the generating is based on applying a weighting to respective quantified liquidity risk indicators in the plurality of quantified liquidity risk indicators; and
wherein the displaying further comprises displaying the liquidity risk index.

* * * * *